US008336443B2

(12) United States Patent
Abe et al.

(10) Patent No.: US 8,336,443 B2
(45) Date of Patent: *Dec. 25, 2012

(54) HYDRAULIC WORKING MACHINE

(75) Inventors: Toshihiro Abe, Osaka (JP); Yusuke Kajita, Ushiku (JP); Kazunori Nakamura, Tsuchiura (JP); Kouji Ishikawa, Niihari-gun (JP); Hideo Karasawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 12/428,203

(22) Filed: Apr. 22, 2009

(65) Prior Publication Data
US 2009/0199552 A1 Aug. 13, 2009

Related U.S. Application Data

(62) Division of application No. 10/542,201, filed as application No. PCT/JP2004/000168 on Jan. 14, 2004, now Pat. No. 7,562,615.

(30) Foreign Application Priority Data

Jan. 14, 2003 (JP) .................................. 2003-005808
May 21, 2003 (JP) .................................. 2003-143632

(51) Int. Cl.
*F15B 11/024* (2006.01)
(52) U.S. Cl. ................................ 91/436; 91/445; 91/446
(58) Field of Classification Search ..................... 60/468; 91/436, 445, 446
See application file for complete search history.

(56) References Cited

U.S. PATENT DOCUMENTS

| 5,174,189 A | 12/1992 | Kamimura |
| 5,442,912 A | 8/1995 | Hirata et al. |
| 7,562,615 B2 * | 7/2009 | Abe et al. ........................ 91/436 |

FOREIGN PATENT DOCUMENTS

| EP | 0 262 098 | 3/1988 |
| GB | 2 134 187 A | 8/1984 |
| JP | 2-18496 | 2/1990 |
| JP | 06-144794 | 5/1994 |
| JP | 07-305379 | 11/1995 |
| WO | WO 94/13959 | 6/1994 |

* cited by examiner

*Primary Examiner* — F. Daniel Lopez
(74) *Attorney, Agent, or Firm* — Crowell & Moring LLP

(57) ABSTRACT

A hydraulic circuit for a hydraulic working machine is composed of a main pump 21, a boom cylinder 11 arranged for extension or contraction by pressure oil from the main pump 21, a directional control valve 22 for controlling flows of pressure oil to be fed from the main pump 21 to a bottom chamber 11a and rod chamber 12b of the boom cylinder 11, a control unit 23 for performing a change-over control of the directional control valve 22, a pilot pump 24, a jack-up selector valve 25 for controlling a flow of pressure oil delivered from the pilot pump 24, a flow control valve 26 connected on an upstream side of the directional control valve 22 to a meter-in port of the directional control valve 22 such that the flow control valve 26 can be changed over by the jack-up selector valve 25, and a center bypass selector valve 27 connected on a downstream side of the directional control valve 22 to a center bypass port of the directional control valve 22 such that the center bypass selector valve 27 can be changed over by the jack-up selector valve 25. The hydraulic circuit performs a change-over of the jack-up selector valve 25 in accordance with a bottom pressure on the boom cylinder 11.

4 Claims, 14 Drawing Sheets

HYDRAULIC WORKING MACHINE

CROSS-REFERENCE TO RELATED APPLICATIONS

This Application is a divisional of application Ser. No. 10/542,201, filed Jan. 31, 2006; which is based upon 35 U.S.C. 371 Application No. PCT/JP2004/000168 filed Jan. 14, 2004, further claiming priority to Japanese Patent Application No. JP 2003-005808 filed Jan. 14, 2003 and JP 2003-143632 filed May 21, 2003.

TECHNICAL FIELD

This invention relates to a hydraulic working machine such as a hydraulic excavator in which working elements such as a boom, arm and bucket are driven by double-acting hydraulic cylinders, and specifically to a hydraulic circuit construction for feeding pressure oil to bottom chambers and rod chambers of the hydraulic cylinders.

BACKGROUND ART

Conventionally-known, hydraulic working machines include those provided with a travelling state detection means for detecting their travelling state and a selector valve for changing over a pilot line, through which a pilot signal for lowering a boom (in a direction to cause contraction of a hydraulic cylinder for the boom) is transmitted, to a cut-off position or a communicating position on the basis of a signal from the travelling state detection means such that, when a combined operation of a travelling operation and a boom-lowering operation is performed by changing over the selector valve to the pilot-line-communicating position upon detection of a travelling state by the travelling state detection means, pressure oil is fed from a main pump to a rod chamber of the hydraulic cylinder for the boom to permit a jack-up of a body by the boom (see, for example, Patent Document 1 JP-A-06-002344, FIG. 1).

The conventionally-known, hydraulic working machines also include those of the type that upon lowering a boom, return oil from a bottom chamber of a boom cylinder is regenerated in a rod chamber of the boom cylinder to permit avoiding fluctuations in boom operating speed, which would otherwise take place as a result of changes or the like in an external force applied to the boom cylinder, while making it possible to reduce the horse power consumption of a main pump (see, for example, Patent Document 2—JP-A-05-302604, FIG. 1).

DISCLOSURE OF THE INVENTION

Of the above-described conventional technologies, the technology disclosed in Patent Document 1 involves an inconvenience in that, when a pressing force is applied to the boom in the course of a simple boom-lowering operation, the rod chamber of the boom cylinder is brought into a vacuum state to form a cavity and hence to have a tendency to develop an operational delay in the operation of the boom, because the pressure oil from the main pump is fed to the rod chamber of the boom cylinder only when the combined operation of the travelling operation and the boom-lowering operation is performed.

The technology disclosed in Patent Document 2, on the other hand, is accompanied by an inconvenience in that, in a simple boom-lowering operation which does not require any pressing force to jack up a body, the pressure oil from the main pump is not fed to the rod chamber of the boom cylinder and the horse power consumption of the pump conversely becomes greater than the regeneration of only the return oil from the bottom chamber in the rod chamber of the boom cylinder without feeding pressure oil from the main pump to the rod chamber, because of the construction that the pressure oil from the main pump is normally fed to the rod chamber of the boom cylinder upon lowering the boom. Moreover, the pressure oil delivered from the main pump is fed to the rod chamber of the boom cylinder when another working element is driven while allowing the boom to fall. This leads to a relative decrease in the amount of pressure oil to be fed to the actuator for driving another working element, thereby inconveniently developing poor energy efficiency. It is to be noted that a jack-up is performed, for example, upon escaping from a swamp or upon travelling while supporting a boom by the body when moving down on and along a steep slope.

The present invention has been completed to resolve such defects of the conventional technologies, and its object is to provide a hydraulic working machine that makes it possible to achieve a reduction in the horse power consumption of a main pump and an improvement in energy efficiency upon performing a simple lowering operation of a working element and also to produce a large pressing force such as a jack-up force for a body.

To achieve the above-described object, the present invention is characterized, in a first aspect thereof, in that in a hydraulic working machine provided with a double-acting hydraulic cylinder arranged for extension or contraction by pressure oil, which is delivered from a main pump, to drive a working element, a directional control valve for controlling a flow of pressure oil to be fed from the main pump to the hydraulic cylinder, and a control unit for performing a change-over control of the directional control valve, the hydraulic working machine is provided with a jack-up selector valve for being changed over in flow-line when a feed pressure to the hydraulic cylinder has reached a predetermined pressure, and a flow-line changing means for changing a flow-line for pressure oil, which is to be fed from the main pump to a meter-in port of the directional control valve, from an open side to a closed side in response to a change-over control of the selector valve, wherein, when the holding pressure on the hydraulic cylinder is equal to or higher than the predetermined pressure upon lowering the working element, the jack-up selector valve is changed over to a first selected position to change over the flow-line changing means to the closed side such that pressure oil delivered from the main pump is not fed to a non-holding pressure feeding side of the hydraulic cylinder, and when the holding pressure on the hydraulic cylinder is lower than the predetermined pressure upon lowering the working element, the jack-up selector valve is changed over to a second selected position to change over the flow-line changing means to the open side such that pressure oil delivered from the main pump is fed to a holding pressure side of the hydraulic cylinder via the directional control valve.

To achieve the above-descried object, the present invention is also constructed, in a second aspect thereof, such that in a hydraulic working machine provided with a main pump, a working element, a double-acting hydraulic cylinder arranged for extension or contraction by pressure oil, which is delivered from a main pump, to drive the working element, a directional control valve for controlling flows of pressure oil to be fed from the main pump to a bottom chamber and rod chamber of the hydraulic cylinder, and a control unit for performing a change-over control of the directional control valve, the hydraulic working machine is provided with a jack-up selector valve for being changed over when a bottom pressure on the hydraulic cylinder has reached a predetermined pressure, and a flow-line changing means for changing a flow-line for pressure oil, which is to be fed from the main pump to a meter-in port of the directional control valve, from an open side to a closed side in response to a change-over control of the jack-up selector valve, wherein, when the bottom pressure on the hydraulic cylinder is equal to or higher than the predetermined pressure upon lowering the working element, the jack-up selector valve is changed over to a first selected position to change over the flow-line changing means to the closed side such that pressure oil delivered from the main pump is not fed to the rod chamber of the hydraulic cylinder, and when the bottom pressure on the hydraulic cylinder is lower than the predetermined pressure upon lowering the working element, the jack-up selector valve is changed over to a second selected position to change over the flow-line changing means to the open side such that pressure oil delivered from the main pump is fed to the rod chamber of the hydraulic cylinder via the directional control valve.

For example, a hydraulic cylinder for a boom, the hydraulic cylinder is being arranged on a hydraulic excavator, has a high pressure on the side of its bottom chamber under the weight of the boom, an arm or the like as a working element in a state that no external force is acting. When a pressing force is applied to the working element, on the other hand, a pulling force is applied to the hydraulic cylinder for the boom so that the hydraulic cylinder has a low pressure on the side of its bottom chamber. Therefore, by monitoring changes in the bottom pressure and, when the bottom pressure on the hydraulic cylinder for driving the working element is equal to or higher than the predetermined pressure upon lowering the working element, changing over the jack-up selector valve to the first selected position to change over the flow-line changing means to the closed side such that pressure oil delivered from the main pump is not fed to the rod chamber of the hydraulic cylinder, the horse power consumption of the pump can be reduced upon performing a simple lowering operation of the working element that does not require any pressing force for jacking up the body and, when a working element is operated in combination with allowing another working element to fall, pressure oil to be fed to an actuator from the main pump to drive the first-mentioned working element can be relatively increased. Accordingly, the energy efficiency of the hydraulic working machine can be improved. When the bottom pressure on the hydraulic cylinder is lower than the predetermined pressure upon lowering the working element and the jack-up selector valve is changed over to the second selected position to change over the flow-line changing means to the open side such that the pressure oil delivered from the main pump is fed to the rod chamber of the hydraulic cylinder via the directional control valve, on the other hand, a large pressing force can be produced at the working element, thereby making it possible to jack up the body.

To achieve the above-described object, the present invention is also constructed, in a third aspect thereof, such that in a hydraulic working machine provided with a first and second main pumps, a first track unit for being driven by pressure oil delivered from the first main pump, a second track unit for being driven by pressure oil delivered from the second main pump, a first directional control valve for controlling a flow of pressure oil to be fed from the first main pump to the first track unit, a second directional control valve for controlling a flow of pressure oil to be fed from the second main pump to the second track unit, a working element, a double-acting hydraulic cylinder arranged for extension or contraction by pressure oil, which is delivered from the first and second main pumps, to drive the working element, a third directional control valve for controlling flows of pressure oil to be fed from the first main pump to a bottom chamber and rod chamber of the hydraulic cylinder, a fourth directional control valve for controlling flows of pressure oil to be fed from the second main pump to the bottom chamber and rod chamber of the hydraulic cylinder, a first control unit for performing change-over controls of the first and second directional control valves, and a second control unit for performing change-over controls of the third and fourth directional control valves, the hydraulic working machine is provided with a jack-up selector valve for being changed over when a bottom pressure on the hydraulic cylinder has reached a predetermined pressure, and a flow-line changing means for changing a flow-line for pressure oil, which is to be fed from the first main pump to a meter-in port of the third directional control valve, from an open side to a closed side in response to a change-over control of the jack-up selector valve, wherein, when the bottom pressure on the hydraulic cylinder is equal to or higher than the predetermined pressure upon lowering the working element, the jack-up selector valve is changed over to a first selected position to change over the flow-line changing means to the closed side such that pressure oil delivered from the first and second main pumps is not fed to the rod chamber of the hydraulic cylinder, and when the bottom pressure on the hydraulic cylinder is lower than the predetermined pressure upon lowering the working element, the jack-up selector valve is changed over to a second selected position to change over the flow-line changing means to the open side such that pressure oil delivered from the first and second main pumps is fed to the rod chamber of the hydraulic cylinder via the third and fourth directional control valves.

In this construction, it is also possible to exhibit similar advantageous effects as the above-described second means for resolving the defects, that is, to achieve a reduction in the horse power consumption of the pump and an improvement in the energy efficiency of the hydraulic working machine upon performing a simple lowering operation of the working element, and further, to produce a large pressing force at the working element. In addition, owing to the arrangement of the travelling hydraulic circuit, it is also possible to jack up the body by performing a combined operation of a traveling operation and a working-element-lowering operation.

To achieve the above-described object, the present invention is constructed, in a fourth aspect thereof, such that in the hydraulic working machine of the above-described first or second construction, the hydraulic working machine is further provided with a regeneration circuit for regenerating a portion of meter-out oil, which is discharged from the bottom chamber of the hydraulic cylinder, into meter-in oil to be fed to the rod chamber of the hydraulic cylinder.

When a regeneration circuit is arranged as described above, regenerated oil is fed from the bottom chamber to the rod chamber of the hydraulic cylinder even when a pressing force is applied to the working element in the course of a simple lowering operation of the working element. It is, therefore, possible to prevent the rod chamber of the hydraulic cylinder from being brought into a vacuum state to form a cavity, and hence, to continue a smooth operation of the working element.

To achieve the above-described object, the present invention is also constructed such that in the hydraulic working machine of any one of the above-described constructions, the hydraulic working machine is provided with a hydraulically-piloted selector valve as the jack-up selector valve.

When a hydraulically-piloted selector valve is arranged as the jack-up selector valve as described above, it is only necessary to connect a signal port of the jack-up selector valve and the bottom chamber of the hydraulic cylinder with each other via a line, so that the construction is simple. It is, accordingly, possible to realize at low cost a hydraulic working machine which can achieve a reduction in the horse power consumption of the pump and an improvement in energy efficiency upon performing a simple lowering operation of the working element and can also jack up the body.

To achieve the above-described object, the present invention is also constructed, in a fifth aspect thereof, such that in a hydraulic working machine provided with a variable displacement hydraulic pump as a main pump, a swash angle control means for controlling a displacement of the variable displacement hydraulic pump, at least one working element, at least one actuator arranged for extension or contraction by pressure oil, which is delivered from the variable displacement hydraulic pump, to drive the working element, a directional control valve for controlling a flow of pressure oil to be fed from the variable displacement hydraulic pump to the hydraulic cylinder, a pilot control unit for controlling a stroke of the directional control valve, and a swash angle instruction means for outputting a swash angle control signal to the swash angle control means in response to a signal from the pilot control unit, the hydraulic working machine is provided with a jack-up selector valve for being changed over when a holding pressure on the actuator has reached a predetermined pressure, and a flow-line changing means for changing a flow-line for pressure oil, which is to be fed from the variable displacement hydraulic pump to a meter-in port of the directional control valve, from an open side to a closed side in response to a change-over control of the jack-up selector valve, wherein, when the holding pressure on the actuator is equal to or higher than the predetermined pressure upon lowering the working element, the jack-up selector valve is changed over to a first selected position to change over the flow-line changing means to the closed side such that pressure oil to be fed from the variable displacement hydraulic pump to the actuator is cut off and the displacement of the variable displacement hydraulic pump is decreasingly controlled, and when the holding pressure on the actuator is lower than the predetermined pressure upon lowering the working element, the jack-up selector valve is changed over to a second selected position to change over the flow-line changing means to the open side such that pressure oil delivered from the variable displacement hydraulic pump is fed to the actuator via the directional control valve and the displacement of the variable displacement hydraulic pump is increasingly controlled by the swash angle instruction means.

For example, a hydraulic cylinder for a boom, said hydraulic cylinder is being arranged on a hydraulic excavator, has a high pressure on the side of its bottom chamber under the weight of the boom, an arm or the like as a working element in a state that no external force is acting. When a pressing force is applied to the working element, on the other hand, a pulling force is applied to the hydraulic cylinder for the boom so that the hydraulic cylinder has a low pressure on the side of its bottom chamber. Therefore, by monitoring changes in the holding pressure on an actuator such as the bottom pressure on the hydraulic cylinder for the boom and, when the holding pressure on the hydraulic cylinder for driving the working element is equal to or higher than the predetermined pressure upon lowering the working element, changing over the jack-up selector valve to the first selected position to change over the flow-line changing means to the closed side such that pressure oil delivered from the variable displacement hydraulic pump as a main pump is not fed to the actuator, the horse power consumption of the pump can be reduced upon performing a simple lowering operation of the working element that does not require any pressing force for jacking up the body and, when a working element is operated in combination with allowing another working element to fall, pressure oil to be fed to an actuator from the variable displacement hydraulic pump to drive the first-mentioned working element can be relatively increased. Accordingly, the energy efficiency of the hydraulic working machine can be improved. When the holding pressure on the actuator is lower than the predetermined pressure upon lowering the working element and the jack-up selector valve is changed over to the second selected position to change over the flow-line changing means to the open side such that the pressure oil delivered from the variable displacement hydraulic pump is fed to the actuator via the directional control valve, on the other hand, a large pressing force can be produced at the working element, thereby making it possible to jack up the body. In addition, when the holding pressure on the actuator for driving the working element is equal to or higher than the predetermined pressure upon lowering the working element, the displacement of the variable displacement hydraulic pump is decreasingly controlled, and when the holding pressure on the actuator is lower than the predetermined pressure upon lowering the working element, the displacement of the variable displacement hydraulic pump is increasingly controlled by the swash angle instruction means. This makes it possible to reduce the horse power consumption of the pump upon performing a simple lowering operation of the working element and hence to reduce the fuel consumption of the hydraulic working machine, and further, to promptly feed to the actuator pressure oil as much as needed upon performing a pressing operation of the working element. It is, therefore, possible to smoothly effect a switchover from a simple lowering operation of the working element to a pressing operation of the working element.

To achieve the above-described object, the present invention is also constructed, in a sixth aspect thereof, such that in a hydraulic working machine provided with a first and second variable displacement hydraulic pumps as main pumps, a first and second swash angle control means for independently controlling displacements of the first and second variable displacement hydraulic pumps, respectively, a first track unit for being driven by pressure oil delivered from the first variable displacement hydraulic pump, a second track unit for being driven by pressure oil delivered from the second variable displacement hydraulic pump, a first directional control valve for controlling a flow of pressure oil to be fed from the first variable displacement hydraulic pump to the first track unit, a second directional control valve for controlling a flow of pressure oil to be fed from the second variable displacement hydraulic pump to the second track unit, at least one working element, at least one actuator arranged for extension or contraction by pressure oil, which is delivered from the first and second variable displacement hydraulic pumps, to drive the working element, a third directional control valve for controlling a flow of pressure oil to be fed from the first variable displacement hydraulic pump to the actuator, a fourth directional control valve for controlling a flow of pressure oil to be fed from the second variable displacement hydraulic pump to the actuator, a pilot control unit for performing change-over controls of the first and second directional control valves, and a swash angle instruction means for outputting a swash angle control signal to the swash angle control means in response to a signal from the pilot control unit, the hydraulic working machine is provided with a jack-up selector valve for being changed over when a holding pressure on the actuator has reached a predetermined pressure, and a flow-line changing means for changing a flow-line for pressure oil, which is to be fed from the first variable displacement hydraulic pump to a meter-in port of the third directional control valve, from an open side to a closed side in response to a change-over control of the jack-up selector valve, wherein, when the holding pressure on the actuator is equal to or higher than the predetermined pressure upon lowering the working element, the jack-up selector valve is changed over to a first selected position to change over the flow-line changing means to the closed side such that pressure oil to be fed from the first and second variable displacement hydraulic pumps to the actuator is cut off and the displacements of the first and second variable displacement hydraulic pumps are decreasingly controlled, and when the holding pressure on the actuator is lower than the predetermined pressure upon lowering the working element, the jack-up selector valve is changed over to a second selected position to change over the flow-line changing means to the open side such that pressure oil delivered from the first and second variable displacement hydraulic pumps is fed to the actuator via the third and fourth directional control valves and the displacements of the first and second variable displacement hydraulic pumps are increasingly controlled by the swash angle instruction means.

In this construction, it is also possible to exhibit similar advantageous effects as the above-described second means for resolving the defects, that is, to produce a large pressing force at the working element while achieving a reduction in the horse power consumption of the pump and an improvement in the energy efficiency of the hydraulic working machine upon performing a simple lowering operation of the working element, and further to smoothly effect a switchover from a simple lowering operation of the working element to a pressing operation of the working element. In addition, owing to the arrangement of the travelling hydraulic circuit, it is also possible to jack up the body by performing a combined operation of a traveling operation and a working-element-lowering operation.

To achieve the above-described object, the present invention is also constructed, in a seventh aspect thereof, such that in the hydraulic working machine of the above-described first, second or fifth construction, the flow-line changing means comprises a flow control valve connected on an upstream side of the directional control valve to the meter-in port of the directional control valve such that the flow control valve is changed over to a closed position when the jack-up selector valve has been changed over to the first selected position and is changed over to an open position when the jack-up selector valve has been changed over to the second selected position, and a center bypass selector valve connected on a downstream side of the directional control valve to a center bypass port of the directional control valve such that the center bypass selector valve is changed over to an open position when the jack-up selector valve has been changed over to the first selected position and is changed over to a closed position when the jack-up selector valve has been changed over to the second selected position.

When the flow-line changing means in the first, second or fifth means for resolving the defects is constructed of a flow control valve and center bypass selector valve, which are changed over depending on the selected position of the jack-up selector valve, as described above, the flow control valve and center bypass selector valve are changed over to the closed position and the open position, respectively, when the jack-up selector valve has been changed over to the first selected position, in other words, when the working element falls by its own weight. As a result, the pressure oil delivered from the main pump returns to a pressure oil reservoir through the center bypass port of the directional control valve and the center bypass selector valve so that the feeding of the pressure oil to the rod chamber of the hydraulic cylinder is stopped. When the jack-up selector valve has been changed over to the second selected position, in other words, a pressing force is applied to the working element, the flow control valve is changed over to the open position and the center bypass selector valve is changed over to the closed position. As a result, the pressure oil delivered from the main pump is fed to the rod chamber of the hydraulic cylinder through the flow control valve and the meter-in port of the directional control valve. It is, therefore, possible achieve a reduction in the horse power consumption of the pump and an improvement in the energy efficiency of the hydraulic working machine upon performing a simple lowering operation of the working element. In addition, it is also possible to produce a large pressing force at the working element and hence, to jack up the body.

To achieve the above-described object, the present invention is also constructed, in an eighth aspect thereof, such that in the hydraulic working machine of the above-described third or sixth construction, the flow-line changing means comprises a flow control valve connected on an upstream side of the third directional control valve to the meter-in port of the third directional control valve such that the flow control valve is changed over to a closed position when the jack-up selector valve has been changed over to the first selected position and is changed over to an open position when the jack-up selector valve has been changed over to the second selected position, and a center bypass selector valve connected on a downstream side of the third directional control valve to a center bypass port of the third directional control valve such that the center bypass selector valve is changed over to an open position when the jack-up selector valve has been changed over to the first selected position and is changed over to a closed position when the jack-up selector valve has been changed over to the second selected position.

In this construction, it is also possible to exhibit similar advantageous effects as the above-described third means for resolving the defects, that is, to achieve a reduction in the horse power consumption of the pump and an improvement in the energy efficiency of the hydraulic working machine upon performing a simple lowering operation of the working element, and further to jack up the body by performing a combined operation of a traveling operation and a working-element-lowering operation.

To achieve the above-described object, the present invention is also constructed, in a ninth aspect thereof, such that in the hydraulic working machine of any one of the above-described seventh to ninth constructions, the hydraulic working machine is provided with a hydraulically-piloted selector valve as the jack-up selector valve, and the hydraulically-piloted selector valve is provided at a pilot port thereof with a restrictor.

When a hydraulically-piloted selector valve is arranged as the jack-up selector valve as described above, it is only necessary to connect a signal port of the jack-up selector valve and the bottom chamber of the hydraulic cylinder with each other via a line, so that the construction is simple. It is, accordingly, possible to realize at low cost a hydraulic working machine which can achieve a reduction in the horse power consumption of the pump and an improvement in energy efficiency upon performing a simple lowering operation of the working element and can also jack up the body. When the hydraulically-piloted selector valve is provided at the pilot port thereof with a restrictor, it is possible to avoid hunting of the hydraulically-piloted selector valve, and hence, to smoothly and surely effect a switchover from a simple lowering operation of the working element to a pressing operation of the working element.

To achieve the above-described object, the present invention is also constructed, in a tenth aspect thereof, such that in the hydraulic working machine of any one of the above-described first to ninth constructions, the hydraulic working machine is further provided with a solenoid-operated selector valve for performing a change-over control of the jack-up selector valve, a pressure sensing means for sensing a pressure value in the bottom chamber of the hydraulic cylinder, and an electric control means for operating the solenoid-operated selector valve on a basis of a pressure sensed by the pressure sensing means.

When a solenoid-operated selector valve is arranged as the jack-up selector valve as described above, it is possible to omit at least a line which connects the bottom chamber (holding pressure side) of the hydraulic cylinder and the signal port of the jack-up selector valve with each other, thereby making it possible to achieve simplification of the hydraulic circuit.

To achieve the above-described object, the present invention is constructed, in an eleventh aspect thereof, such that in the hydraulic working machine of the above-described fifth or sixth construction, a combination of plural shuttle valves, which select a highest one of a predetermined group of control signal pressures among control signal pressures produced by the pilot control unit, is used as the swash angle instruction means.

When a combination of plural shuttle valves is used as the swash angle instruction means as described above, a desired control signal pressure can be surely selected by a simple circuit construction, thereby making it possible to realize at low cost a hydraulic working machine that increasingly controls the displacement of the variable displacement hydraulic pump by the swash angle instruction means upon performing a pressing operation of the working element. When the highest pressure is selected from the predetermined group of control signal pressure by the swash angle instruction means, pressure oil can be surely fed as much as needed to the actuator upon performing a pressing operation of the working element, thereby making it possible to smoothly and surely effect a switchover from a simple lowering operation of the working element to a pressing operation of the working element.

To achieve the above-described object, the present invention is also constructed, in a twelfth aspect thereof, such that in the hydraulic working machine of each of the above-described constructions, the lowered working element is a boom, and the actuator is a hydraulic cylinder for the boom.

When a boom and a hydraulic cylinder for the boom are arranged as the working element and the actuator, respectively, as described above, the hydraulic working machine such as a hydraulic excavator which is provided with the boom and the hydraulic cylinder for the boom can exhibit the advantageous effects described above with respect to the fifth and sixth means for resolving the defects.

To achieve the above-described object, the present invention is also constructed, in a thirteenth aspect thereof, such that in the hydraulic working machine of the above-described twelfth construction, the hydraulic working machine is provided with a regeneration circuit for regenerating a portion of meter-out oil, which is discharged from a bottom chamber of the hydraulic cylinder for the boom, into meter-in oil to be fed to a rod chamber of the hydraulic cylinder for the boom.

When a regeneration circuit is arranged as described above, regenerated oil is fed from the bottom chamber to the rod chamber of the hydraulic cylinder for the boom even when a pressing force is applied to the boom in the course of a simple lowering operation of the working element. It is, therefore, possible to prevent the rod chamber of the hydraulic cylinder for the boom from being brought into a vacuum state to form a cavity, and hence, to continue a smooth operation of the boom.

It is to be noted that the terms "equal to or higher than the predetermined pressure" and "lower than the predetermined pressure" as used herein indicate the differentiation of situations into those higher than the predetermined pressure as a standard and those lower than the predetermined pressure as the standard and are a matter of design choice set as desired at the time of designing as to whether the selected position of the jack-up selector valve in the case of the predetermined pressure should be set at the first selected position or at the second selected position.

When a hydraulically-piloted selector valve is arranged as the jack-up selector valve as described above, it is only necessary to connect a signal port of the jack-up selector valve and the bottom chamber of the hydraulic cylinder with each other via a line, so that the construction is simple. It is, accordingly, possible to realize at low cost a hydraulic working machine which can achieve a reduction in the horse power consumption of the pump and an improvement in energy efficiency upon performing a simple lowering operation of the working element and can also jack up the body.

When a solenoid-operated selector valve is arranged as the jack-up selector valve as described above, it is possible to omit at least a line which connects the bottom chamber of the hydraulic cylinder and the signal port of the jack-up selector valve with each other, thereby making it possible to achieve simplification of the hydraulic circuit.

As has been described above, the hydraulic working machine according to the present invention monitors changes in the bottom pressure on the hydraulic cylinder which drives the working element and, when the bottom pressure on the hydraulic cylinder which drives the working element is equal to or higher than the predetermined pressure upon lowering the working element, the jack-up selector valve is changed over to the first selected position to change over the flow-line changing means to the closed side such that the pressure oil delivered from the main pump is not fed to the rod chamber of the hydraulic cylinder. Therefore, the horse power consumption of the pump can be reduced upon performing a simple lowering operation of the working element that does not require any pressing force for jacking up the body and, when a working element is operated in combination with allowing another working element to fall, pressure oil to be fed to an actuator from the main pump to drive the first-mentioned working element can be relatively increased. Accordingly, the energy efficiency of the hydraulic working machine can be improved. When the bottom pressure on the hydraulic cylinder is lower than the predetermined pressure upon lowering the working element, on the other hand, the jack-up selector valve is changed over to the second selected position to change over the flow-line changing means to the open side such that the pressure oil delivered from the main pump is fed to the rod chamber of the hydraulic cylinder via the directional control valve. It is, therefore, possible to produce a drive force for the working element as much as needed for jacking up the body and hence to jack up the body by performing the combined operation of a traveling operation and a lowering operation of the working element.

BEST MODES FOR CARRYING OUT THE INVENTION (Outside Construction of Hydraulic Working Machine)

Figure 1:
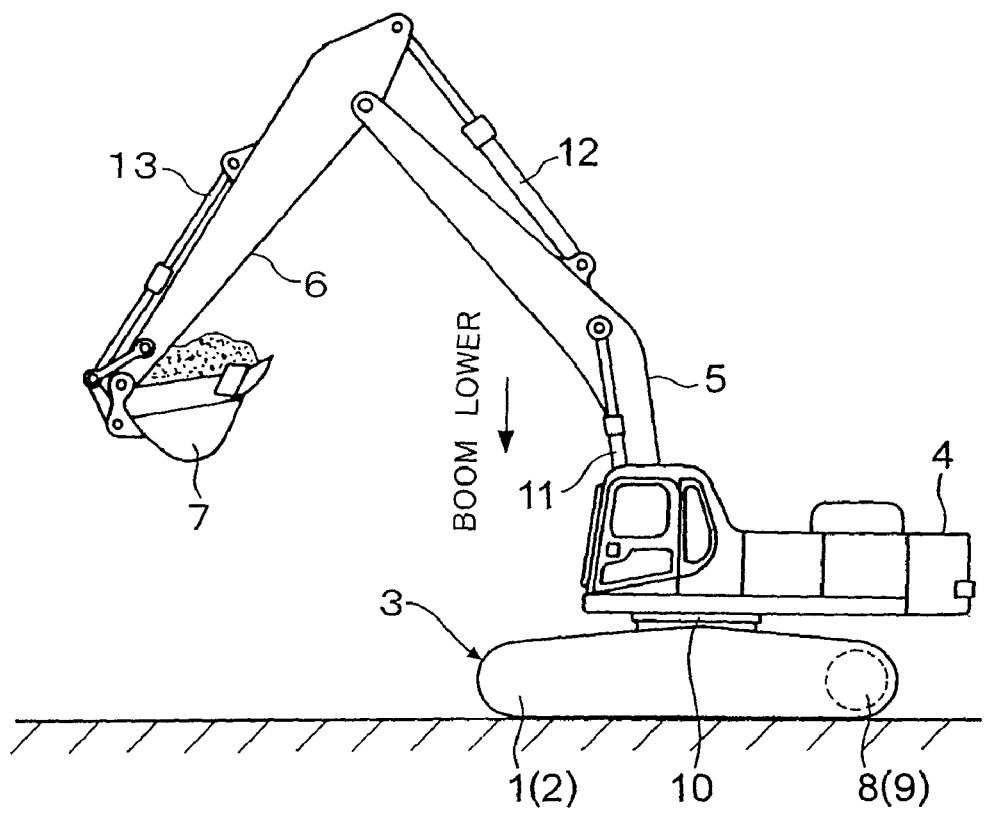
FIG. 1 is a side view of a hydraulic working machine according to the present invention.

Firstly, the outside construction of the hydraulic working machine according to the present invention will be described with reference to FIG. 1. FIG. 1 is a side view of the hydraulic working machine according to the present invention.

The hydraulic working machine illustrated by way of example is a hydraulic excavator, and as shown in FIG. 1, is primarily constructed of a travel base 3 composed of a pair of left and right track units 1,2, a swing upperstructure 4 swingably mounted on the travel base 3, a boom 5 pivotally pin-connected at an end thereof on the swing upperstructure 4, an arm 6 pivotally pin-connected at an end thereof to the boom 5, a bucket 7 pivotally pin-connected at an end thereof to the arm 6, a first and second track motors 8,9 for driving the track units 1,2, a swinging hydraulic motor 10 for driving the swing upperstructure 4, a hydraulic boom cylinder 11 for driving the boom 5, a hydraulic arm cylinder 12 for driving the arm 6, and a hydraulic bucket cylinder 13 for driving the bucket 7.

(First Embodiment of the Hydraulic Circuit)

Figure 2:
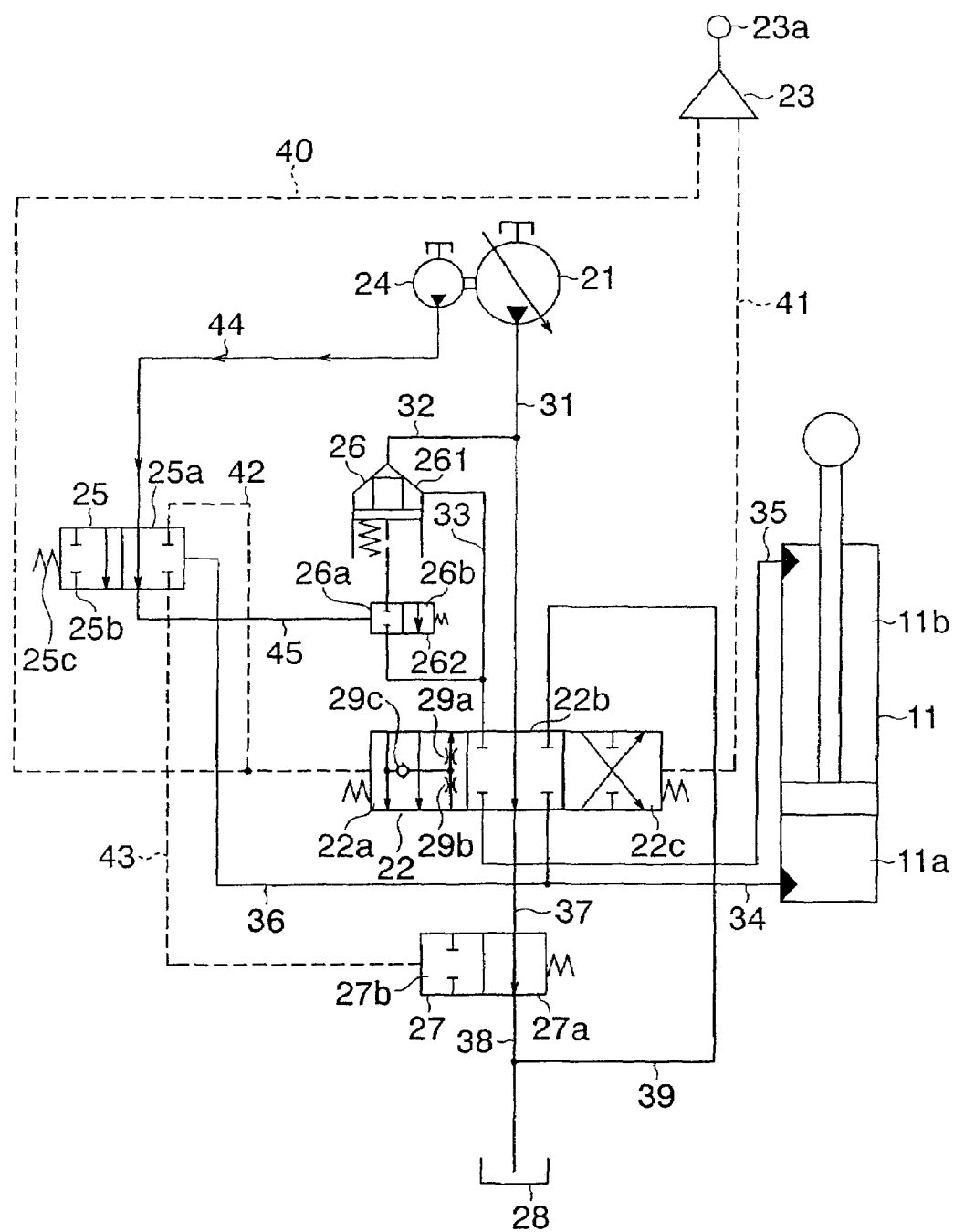
FIG. 2 is a circuit diagram of a hydraulic circuit according to a first embodiment.
Figure 3:
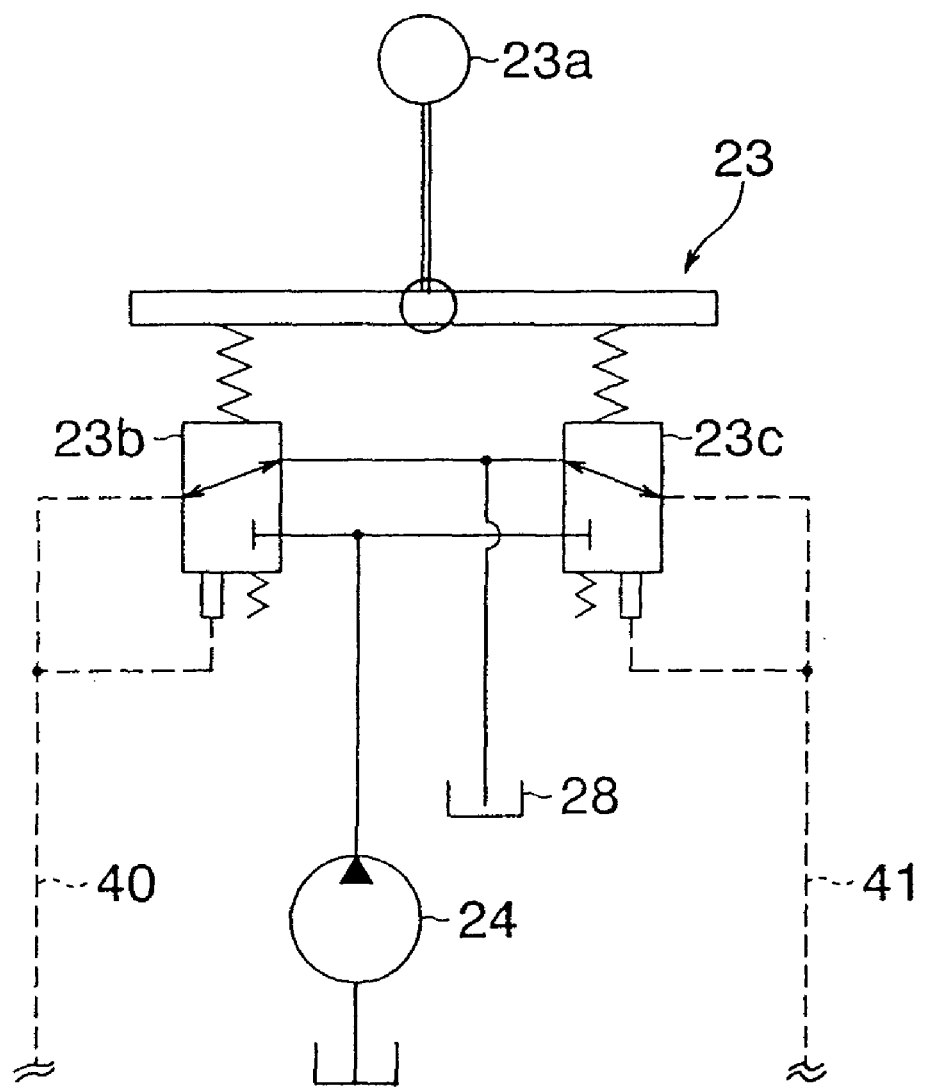
FIG. 3 is a construction diagram of a control unit.

With reference to FIG. 2 and FIG. 3, a description will next be made of the first embodiment of the hydraulic circuit arranged on the hydraulic working machine. FIG. 2 is a fragmentary circuit diagram of the hydraulic circuit according to the first embodiment, and FIG. 3 is a construction diagram of a control unit. As clearly seen from these figures, the hydraulic circuit according to this embodiment is characterized in that a hydraulically-piloted selector valve is arranged as a jack-up selector valve and oil pressure from one main pump is fed to a hydraulic cylinder.

As illustrated in FIG. 2, the hydraulic circuit of this embodiment is primarily constructed of a main pump 21, a double-acting, hydraulic boom cylinder 11 arranged for extension or contraction by pressure oil delivered from the main pump 21 to drive the boom 5, a directional control valve 22 for controlling flows of pressure oil to be fed from the main pump 21 to a bottom chamber 11a and rod chamber 11b of the hydraulic boom cylinder 11, a control unit 23 for performing a change-over control of the directional control valve 22, a pilot pump 24, a jack-up selector valve 25 for controlling a flow of pressure oil delivered from the pilot pump 24, a flow control valve 26 connected on an upstream side of the directional control valve 22 to a meter-in port of the directional control valve 22 such that the flow control valve is changed over by the jack-up selector valve 25, a center bypass selector valve 27 connected on a downstream side of the directional control valve 22 to a center bypass port of the directional control valve 22 such that the center bypass selector valve is changed over by the jack-up selector valve 25, and a reservoir 28. It is to be noted that the jack-up selector valve 25 is a hydraulically-piloted selector valve changed over to communicate pressure oil, which is delivered from the main pump 21, to the meter-in side upon performing a jack-up and that the center bypass selector valve 27 is a selector valve for opening or closing the center bypass.

It is also to be noted that the flow control valve 26 is composed of a poppet valve 261 and a pilot-operated selector valve 262 for communicating a back pressure chamber of the poppet valve 261 and a pump port side of the directional control valve 22 with each other or cutting them off from each other.

Arranged as the directional control valve 22 is one having a regeneration circuit, which is composed of restrictors 29a, 29b and a check valve 29c.

As depicted in FIG. 3, the control unit 23 is constructed of a control lever 23a, and a boom-lowering-side reducing valve 23b and boom-raising-side reducing valve 23c, which are changed over by the control lever 23a.

Arranged between the main pump 21 and the directional control valve 22 are a line 31 directly communicating from the main pump 21 to the center bypass port of the directional control valve 22 and lines 32,33 communicating from the main pump 21 to the meter-in port of the directional control valve 22 via the flow control valve 26. Arranged between the directional control valve 22 and the hydraulic boom cylinder 11 are a line 35 communicating to the bottom chamber 11a and a line 35 communicating to the rod chamber 11b. Between the bottom chamber 11a of the hydraulic boom cylinder 11 and a signal port of the jack-up selector valve 25, a line 36 is arranged for feeding a bottom pressure signal. A line which connects the directional control valve 22 and the reservoir 28 with each other is divided, via the center bypass selector valve 27, into a line 37 on the side of the directional control valve 22 and a line 38 on the side of the reservoir 28, and between the directional control valve 22 and the line 38 on the side of the reservoir 28, a line 39 is arranged to guide a portion of pressure oil, which is discharged from the bottom chamber 11a, to the reservoir 28. Arranged between the control unit 23 and a signal port of the directional control valve 22 are a pilot line 40 for feeding a boom-lowering signal and a pilot line 41 for feeding a boom-raising signal. Further, change-over signal feeding pilot lines 42,43 are arranged to guide a boom-lowering pilot pressure to the center bypass selector valve 27 via the jack-up selector valve 25. In addition, between the pilot pump 24 and a signal port of the selector valve 262 which constitutes the flow control valve 26, change-over signal feeding pilot lines 44,45 are arranged with the jack-up selector valve 25 interposed therebetween.

A description will hereinafter be made about operations of the hydraulic working machine according to the first embodiment constructed as described above.

When the control lever 23a is at a neutral position and no pulling force is applied to the hydraulic boom cylinder 11, the directional control valve 22 assumes a neutral position 22b as shown in FIG. 2. The bottom chamber 11a of the hydraulic boom cylinder 11 has a high pressure to support the dead weight of the boom or the like, the jack-up selector valve 25 is changed over to a selected position 25a, the selector valve 262 in the flow control valve 26 is changed over to a selected position 26a, and the center bypass selector valve 27 maintains a valve element position 27a. Accordingly, the pressure oil delivered from the main pump 21 is guided to the reservoir 28 through the line 31, the center bypass port of the directional control valve 22, the line 37, the center bypass selector valve 27 and the line 38.

When the control lever 23a is operated in a leftward direction as viewed in the figure, that is, in a boom-lowering direction in the above-described state, the pressure oil fed from the pilot pump 24 is reduced in pressure by the reducing valve 23b, the resulting, pressure-reduced pilot pressure is outputted as a boom-lowering signal to the pilot line 40, and the directional control valve 22 is changed over to a selected position 22a. Further, a portion of return oil from the bottom chamber 11a is regenerated in the rod chamber 11b via the restrictor 29b, check valve 29c and line 35, and the rest of the return oil is returned to the reservoir 28 via the restrictor 29a and line 39.

When the bottom pressure is higher than a predetermined change-over pressure set by a spring 25c of the jack-up selector valve 25 in the above-described situation, the selected position of the jack-up selector valve 25 is maintained at the selected position 25a, so that the selected position of the flow control valve 26 is also maintained at the selected position 26a and the center bypass selector valve 27 is also maintained at the valve element position 27a. Accordingly, the pressure oil delivered from the main pump 21 is guided to the reservoir 28 through the line 31, the center bypass port of the directional control valve 22, the line 37, the center bypass selector valve 27 and the line 38 and the pressure oil is fed neither to the bottom chamber 11a nor the rod chamber 11b of the hydraulic boom cylinder 11. Therefore, only the regenerated oil is introduced into the rod chamber 11b, the hydraulic boom cylinder 11 contracts under the dead weight of the boom 5, and the boom 5 is caused to turn in a downward direction (undergoes a so-called free fall).

When the bottom pressure is lower than the change-over pressure for the jack-up selector valve 25 in the situation that the control lever 23a has been operated in the boom-lowering direction, on the other hand, the jack-up selector valve 25 is changed over to a selected position 25b, and the pressure oil, which has been fed from the pilot pump 24 to the signal port of the selector valve 262 in the flow control valve 26 via the pilot line 44 and pilot line 45, is cut off. Accordingly, the selector valve 262 is changed over to a selected position 26b, the back pressure on the poppet valve 261 becomes equal to the pressure in the line 33, and the pressure oil delivered from the main pump 21 is fed to the meter-in port of the directional control valve 22 through the line 32, the poppet valve 261 in the flow control valve 26, and the line 33. Responsive to a change-over of the jack-up selector valve 25, the pressure oil delivered from the pilot pump 24 is fed to the signal port of the center bypass selector valve 27 through the pilot line 40, pilot line 42, jack-up selector valve 25 and pilot line 43. As a consequence, the center bypass selector valve 27 is changed over to a selected position 27b so that the downstream of the center bypass of the directional control valve 22 is cut off. Accordingly, the pressure oil from the main pump 21, said pressure oil having been fed from the line 33 to the meter-in port of the directional control valve 2, is fed to the rod chamber 11b of the hydraulic boom cylinder 11 through the line 35 together with the regenerated oil discharged form the boom chamber 11a, thereby making it possible to produce a strong pressing force such as a jack-up force for the body.

When the control lever 23a is operated in a rightward direction as viewed in the figure, that is, in a boom-raising direction, a pilot pressure is outputted to the pilot line 41 owing to the pressure oil fed from the pilot pump 24 so that the directional control valve 22 is changed over to a selected position 22c. As a result, the pressure oil discharged from the rod chamber 11b is returned to the reservoir 28 through the line 35, directional control valve 22 and line 39. Accordingly, the bottom pressure becomes lower than the operating pressure for the jack-up selector valve 25 so that the flow control valve 26 is changed over to the selected position 26b. As a consequence, the pressure oil fed from the main pump 21 to the meter-in port of the directional control valve 22 through the line 32, flow control valve 26 and line 33 is fed to the bottom chamber 11a through the line 34. The hydraulic boom cylinder 11 is hence caused to extend so that the boom 5 is caused to turn in the upward direction.

The hydraulic working machine according to this embodiment is designed to monitor changes in the bottom pressure of the hydraulic boom cylinder 11 and, when the bottom pressure on the hydraulic boom cylinder 11 is equal to or higher than the predetermined pressure upon lowering the boom, to change over the jack-up selector valve 25 to the selected position 25a, and accordingly, to change over the selector valve 262 in the flow control valve 26 to the selected position 26a and the center bypass selector valve 27 to the valve element position 27a such that the pressure oil delivered from the main pump 21 is not fed to the rod chamber 11b of the hydraulic boom cylinder 11. It is, therefore, possible to reduce the horse power consumption of the pump upon performing a simple boom-lowering operation which does not require a pressing force for jacking up the body. As the pressure oil delivered from the main pump 21 is not fed to the rod chamber 11 of the hydraulic boom cylinder 11 upon performing a simple boom-lowering operation, it is possible to relatively increase the pressure oil to be fed from the main pump 21 to the hydraulic arm cylinder 12 and hydraulic bucket cylinder 13 upon operating the boom 5 in combination with one or more other working elements, for example, the arm 6 and/or bucket 7. This makes it possible to improve the energy efficiency of the hydraulic working machine. When the bottom pressure on the hydraulic boom cylinder 11 is lower than the predetermined pressure upon lowering the boom, on the other hand, the jack-up selector valve 25 is changed over to the selected position 25b, and as a result, the selector valve 262 in the flow control valve 26 is changed over to the selected position 26b and the center bypass selector valve 27 is changed over to the valve element position 27b such that the pressure oil delivered from the main pump 21 is fed to the rod chamber 11b of the hydraulic boom cylinder 11. It is, therefore, possible to produce a large pressing force at the boom 5 and to jack up the body.

The hydraulic working machine according to this embodiment uses, as the directional control valve 22, the regeneration circuit composed of the restrictors 29a,29b and the check valve 29c. Even when a pressing force is applied to the boom 5 in the course of a simple boom-lowering operation, the regenerated oil from the bottom chamber 11a can, therefore, be fed to the rod chamber 11b of the hydraulic boom cylinder 11, thereby making it possible to prevent the rod chamber 11b of the hydraulic boom cylinder 11 from being brought into a vacuum state to form a cavity and hence to continue a smooth operation of the boom 5.

As the hydraulic working machine according to this embodiment is also provided with a hydraulically-piloted selector valve as the jack-up selector valve 25, it is only necessary to connect the signal port of the jack-up selector valve 25 and the bottom chamber 11a of the hydraulic boom cylinder 11 with each other via the line 36, so that the construction is simple. It is, accordingly, possible to realize at low cost a hydraulic working machine which can achieve a reduction in the horse power consumption of the pump and an improvement in energy efficiency upon performing a simple boom-lowering operation and can also jack up the body.

(Second Embodiment of the Hydraulic Circuit)

Figure 4:
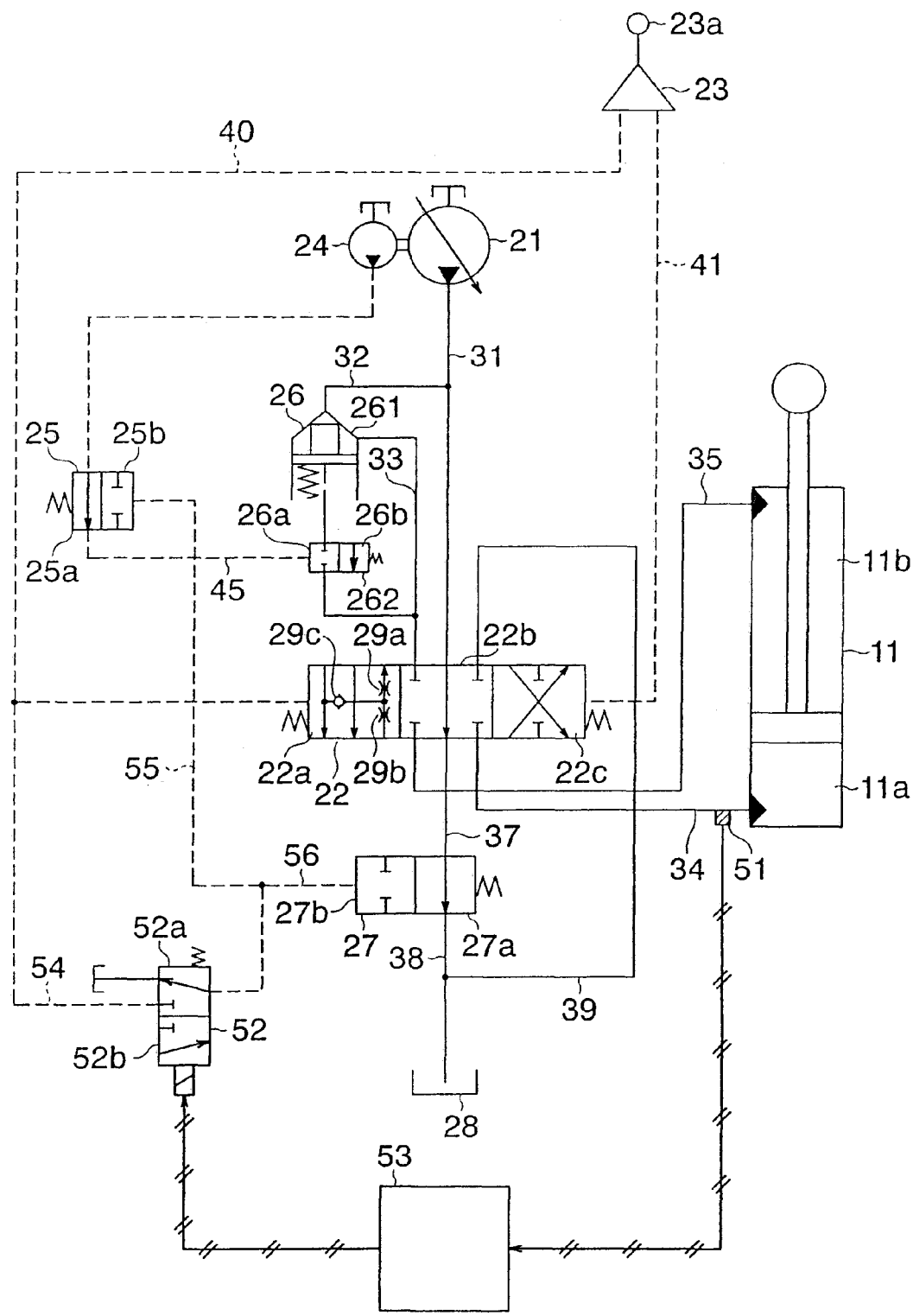
FIG. 4 is a circuit diagram of a hydraulic circuit according to a second embodiment.

With reference to FIG. 4, a description will next be made of the second embodiment of the hydraulic circuit arranged on the hydraulic working machine. FIG. 4 is a circuit diagram of the hydraulic circuit according to the second embodiment, and as clearly seen from this figure, the hydraulic circuit of this embodiment is characterized in that change-over controls of the jack-up selector valve and center bypass selector valve are performed by a solenoid valve.

In FIG. 4, reference numeral 51 indicates a pressure sensor for sensing a bottom pressure on the hydraulic boom cylinder 11, reference numeral 52 a solenoid valve for changing over the jack-up selector valve 25 and center bypass selector valve 27, reference numeral 53 a controller for receiving an output signal from the pressure sensor 51 and outputting an instruction current value to be fed to a signal input part of the solenoid valve 52, reference numeral 54 a line branching out from the pilot line 40 and communicating to the solenoid valve 52, reference numeral 55 a pilot line connecting the signal port of the jack-up selector valve 25 and the solenoid valve 52 with each other, and reference numeral 56 a pilot line connecting the signal port of the center bypass selector valve 27 and the solenoid valve 52 with each other. Other elements which are the same or equivalent to corresponding elements in FIG. 2 are shown by the same reference numerals.

Stored in the controller 53 is a relationship between the values of bottom pressures on the hydraulic boom cylinder 11 as detected by the pressure sensor 51 and instruction current values to be fed to the signal input part of the solenoid valve 52. When a bottom pressure value detected by the pressure sensor 51 is within a range of bottom pressure values upon free falling of the boom, namely, is equal to or higher than a predetermined pressure P0, the solenoid valve 52 retains a valve element position 52a. When a bottom pressure value detected by the pressure sensor 51 is within a range of bottom pressures in the situations that pressing forces are applied to the boom 5, namely, is lower than the predetermined pressure P0, on the other hand, an instruction current is outputted to change over the solenoid valve 52 to a selected position 52b.

When the solenoid valve 52 retains the valve element position 52a, a pilot pressure which serves as a boom-lowering signal is cut off at the solenoid valve 52 and no pilot pressure arises in the pilot lines 55,56. Accordingly, the jack-up selector valve 25 retains the valve element position 25a, so that the selector valve 262 in the flow control valve 26 is changed over to the selected position 26a and the center bypass selector valve 27 retains the valve element position 27a. When the solenoid valve 52 is changed over to the selected position 52b to perform a boom operation, on the other hand, a pilot pressure which serves as a boom-lowering signal is fed to the pilot lines 55,56 via the solenoid valve 52. Accordingly, the jack-up selector valve 25 is changed over to the selected position 25b, so that the selector valve 262 in the flow control valve 26 is changed over to the selected position 26b and the center bypass selector valve 27 is changed over to the selected position 27b.

When the selector valve 262 has been changed over to the selected position 26a and the center bypass selector valve 27 retains the valve element position 27a, the pressure oil to be fed to the rod chamber 11b consists solely of the regenerated oil discharged from the bottom chamber 11a and the boom 5 undergoes a free fall, as described in connection with the first embodiment. When the jack-up selector valve 25 has been changed over to the selected position 25b and the center bypass selector valve 27 has been changed over to the selected position 27b, on the other hand, the regenerated oil and the pressure oil fed from the main pump 21 are combined and fed to the rod chamber 11b and a strong pressing force such as a jack-up force for the body can be obtained, as described in connection with the first embodiment.

The hydraulic working machine according to this embodiment can bring about similar advantageous effects as the hydraulic working machine according to the first embodiment. In addition, it can omit at least the line which connects the bottom chamber 11a of the hydraulic boom cylinder 11 and the signal port of the jack-up selector valve 25 with each other, thereby making it possible to achieve simplification of the hydraulic circuit.

(Third Embodiment of the Hydraulic Circuit)

Figure 5:
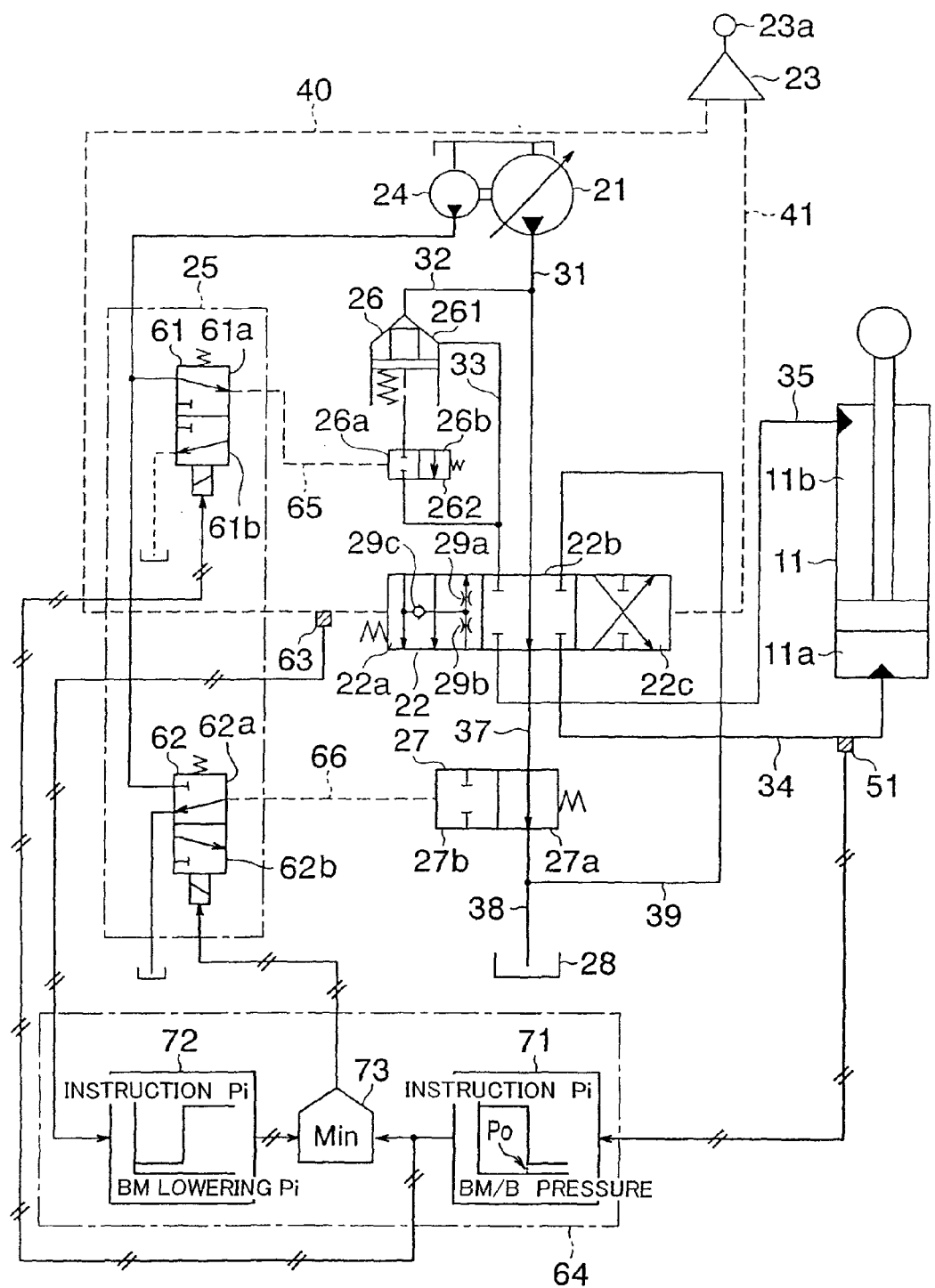
FIG. 5 is a circuit diagram of a hydraulic circuit according to a third embodiment.

With reference to FIG. 5, a description will next be made of the third embodiment of the hydraulic circuit arranged on the hydraulic working machine. FIG. 5 is a circuit diagram of the hydraulic circuit according to the third embodiment, and as clearly seen from this figure, the hydraulic circuit of this embodiment is characterized in that two solenoid valves are arranged as a jack-up selector valve, and change-over controls of these two solenoid valves are performed based on the bottom pressure on the hydraulic boom cylinder and the pilot pressure to the directional control valve.

In FIG. 5, reference numeral 51 indicates a first pressure sensor for sensing a bottom pressure on the hydraulic boom cylinder 11, reference numerals 61,62 a first and second solenoid valves which make up the jack-up selector valve, reference numeral 63 a second pressure sensor for sensing a pilot pressure in the pilot line 40, reference numeral 64 a controller for receiving an output signal from the first pressure sensor 51 and an output signal from the second pressure sensor 63 and outputting instruction current values to change over the selected positions of the first and second solenoid valves 61,62, reference numeral 65 a pilot line connecting the first solenoid valve 61 and the signal port of the selector valve 262 in the flow control valve 26 with each other, and reference numeral 66 a pilot line connecting the second solenoid valve 62 and the signal port of the center bypass selector valve 27 with each other. Other elements which are the same or equivalent to corresponding elements in FIG. 2 are shown by the same reference numerals.

The controller 64 is constructed, as depicted in FIG. 5, of a first storage unit 71 in which a relationship between the values of bottom pressures (BM/B pressures) on the hydraulic boom cylinder 11 as sensed by the first pressure sensor 51 and instruction current values to be fed to signal input parts of the first and second solenoid valves 61,62 is stored, a second storage unit 72 in which a relationship between pilot pressures (boom-lowering signals) in the pilot line 40 as sensed by the second pressure sensor 63 and instruction current values to be fed to the signal input part of the first solenoid valve 62 is stored, and a lowest selection circuit 73 for selecting the lower one of an instruction current value outputted from the first storage unit 71 and an instruction current value outputted from the second storage unit 72 and feeding it to the signal input part of the first solenoid value 62.

According to the controller 64 in this embodiment, when the value of a bottom pressure on the hydraulic boom cylinder 11 as sensed by the pressure sensor 51 is within the range of bottom pressure values upon free falling of the boom, namely, is equal to or higher than the predetermined pressure P0, an instruction current value outputted from the first storage unit 71 is a small value so that the first solenoid valve 61 retains a valve element position 61a, and irrespective of the level of an instruction current outputted from the second storage unit 72, the instruction current of the small value is outputted from the lowest selection circuit 73. Therefore, the second solenoid valve 62 also retains a valve element position 62a. As the pressure oil delivered from the pilot pump 24 is hence fed to the signal port of the selector valve 262 in the flow control valve 26 via the first solenoid valve 61 and the pilot line 65, the selector valve 262 is changed over to the selected position 26a. Further, the pressure oil delivered from the pilot pump 24 is cut off at the second solenoid valve 62, so that no pilot pressure arises in the pilot line 66 and the center bypass selector valve 27 retains the valve element position 27a.

When the value of a bottom pressure on the hydraulic boom cylinder 11 as sensed by the pressure sensor 51 is within the range of bottom pressure values in situations that pressing forces are applied to the boom 5, namely, is lower than the predetermined pressure P0, an instruction current value outputted from the first storage unit 71 is a large value so that the first solenoid valve 61 is changed over to the selected position 61b. From the lowest selection circuit 73, a current corresponding to an instruction current outputted from the second storage unit 72 is also outputted. When a boom-lowering operation is performed, the second solenoid valve 62 and the center bypass selector valve 27 are, therefore, changed over to a selected position 62b and the selected position 27b, respectively. When no boom-lowering operation is performed, on the other hand, the second solenoid valve 62 retains the valve element position 62a so that the center bypass selector valve 27 retains the valve element position 27a.

When the selector valve 262 in the flow control valve 26 has been changed over to the selected position 26a and the center bypass selector valve 27 retains the valve element position 27a, only the regenerated oil discharged from the bottom chamber 11a is fed to the rod chamber 11b and the boom 5 undergoes a free fall, as described in connection with the first embodiment. When the valve element positions of the first solenoid valve 61 and second solenoid valve 62, which make up the jack-up selector valve 25, have been changed over to the selected positions 61b,62b, respectively, and the center bypass selector valve 27 has been changed over to the selected position 27b, on the other hand, the regenerated oil and the pressure oil fed from the main pump 21 are combined and fed to the rod chamber 11b and a strong pressing force such as a jack-up force for the body is produced, as described in connection with the first embodiment.

It is to be noted that the first and second storage units 71,72 have different characteristics as also appreciated from FIG. 5, because the jack-up selector valve 25 and the center bypass selector valve 27 are in such a relationship as being independently changed over in the third embodiment as opposed to the above-mentioned first and second embodiments in each of which the jack-up selector valve 25 and the center bypass selector valve 27 are in such a relationship as being changed over in an interlocked manner. As mentioned above, when the boom bottom pressure is lower than P0 in the first memory unit 71, the first solenoid valve 61 which constitutes the jack-up selector valve 25 is changed over to the selected position 61b no matter whether or not a boom-lowering operation is performed.

When the boom bottom pressure is lower than P0 and no boom-lowering operation is performed, on the other hand, an instruction current value pi outputted from the first storage unit 71 has a large value and an instruction current value pi outputted from the second storage unit 72 has a small value. The smaller one of these instruction current values pi is, therefore, outputted from the smaller selection circuit 73 so that the center bypass selector valve 27 is not changed over while retaining the selected position 27a. Accordingly, if the center bypass selector valve 27 is changed over to the selected position 27b before the first solenoid valve 61 is changed over to the selected position 61b, the delivery pressure from the pump wastefully increases, leading to a deterioration in energy efficiency.

The hydraulic working machine according to this embodiment can also bring about similar advantageous effects as the hydraulic working machine according to the second embodiment.

(Fourth Embodiment of the Hydraulic Circuit)

Figure 6:
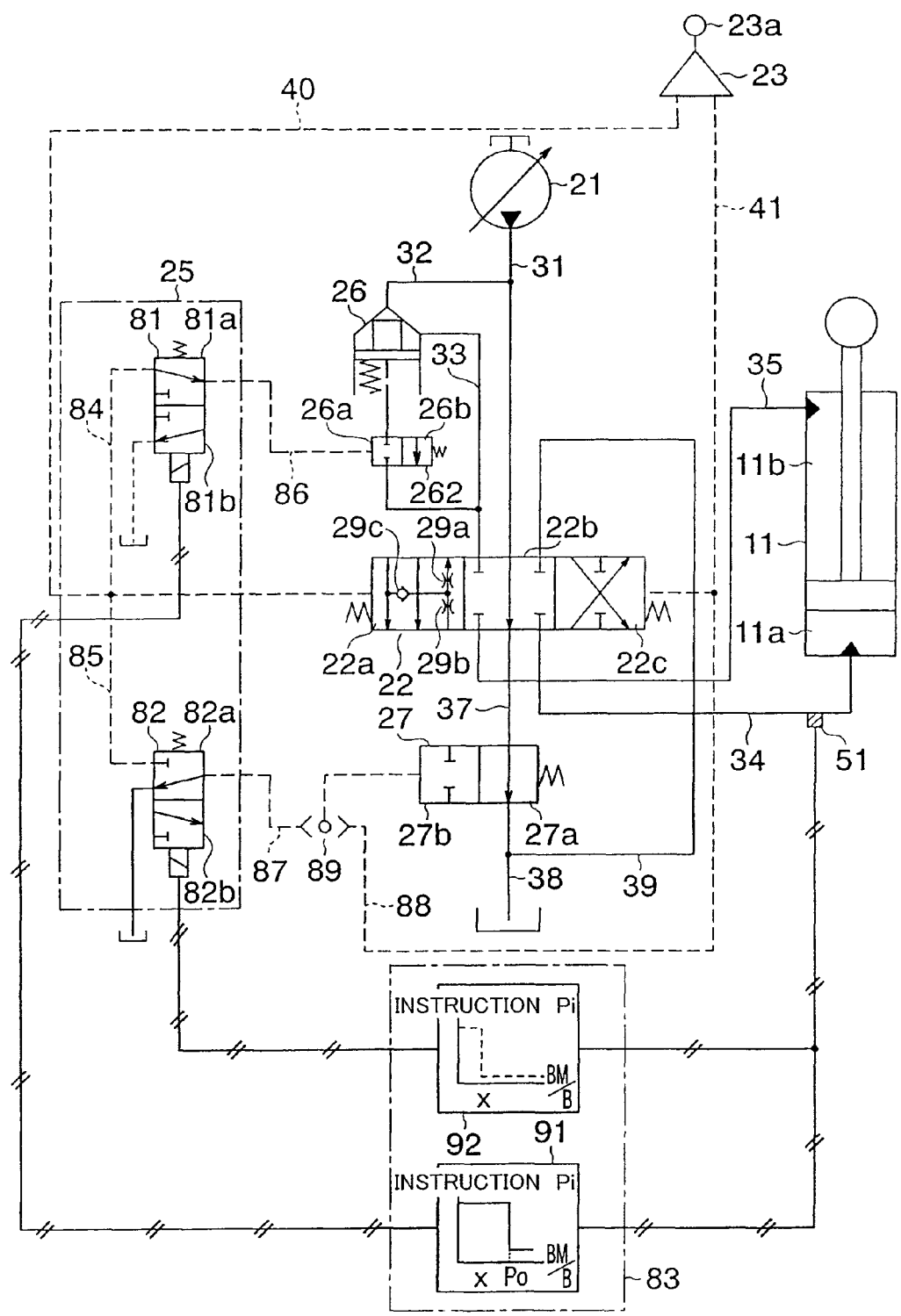
FIG. 6 is a circuit diagram of a hydraulic circuit according to a fourth embodiment.

With reference to FIG. 6, a description will next be made of the fourth embodiment of the hydraulic circuit arranged on the hydraulic working machine. FIG. 6 is a circuit diagram of the hydraulic circuit according to the fourth embodiment, and as clearly seen from this figure, the hydraulic circuit of this embodiment is characterized in that change-over controls of the directional control valve 22, flow control valve 26 and center bypass selector valve 27 are performed by a pilot pressure reduced in pressure by the reducing valve 23b constituting the control unit 23, namely, a boom-lowering signal.

In FIG. 6, reference numeral 51 indicates the first pressure sensor for sensing a bottom pressure on the hydraulic boom cylinder 11, reference numerals 81,82 a first and second solenoid valves which make up the jack-up selector valve, reference numeral 83 a controller for receiving an output signal from the first pressure sensor 51 and outputting instruction current values to change over the selected positions of the first and second solenoid valves 81,82, reference numeral 84 a pilot line branching out from the pilot line 40 and connecting it to the first solenoid valve 81, reference numeral 85 a pilot line branching out from the pilot line 40 and connecting it to the second solenoid valve 82, reference numeral 86 a pilot line connecting the first solenoid valve 81 and the signal port of the selector valve 262 in the flow control valve 26 with each other, reference numeral 87 a pilot line connecting the second solenoid valve 82 and the signal port of the center bypass selector valve 27 with each other, reference numeral 88 a pilot line connecting the second solenoid valve 82 and the boom-raising, reducing valve 23c arranged in the control unit 23 with each other, and numeral 89 a check valve arranged at a point of connection between the pilot line 87 and the pilot line 88. Other elements which are the same or equivalent to corresponding elements in FIG. 2 are shown by the same reference numerals.

The controller 83 is constructed, as depicted in FIG. 6, of a first storage unit 91 in which a relationship between the values of bottom pressures on the hydraulic boom cylinder 11 as sensed by the first pressure sensor 51 and an instruction current value to be fed to a signal input part of the first solenoid valve 81 is stored, and a second storage unit 92 in which a relationship between the values of bottom pressures on the hydraulic boom cylinder 11 as sensed by the first pressure sensor 51 and an instruction current value to be fed to a signal input part of the second solenoid valve 82 is stored. It is to be noted that concerning the instruction current values, standard current values are set in advance and the thus-set current values are used as the instruction current values.

According to the controller 83 in this embodiment, when the value of a bottom pressure on the hydraulic boom cylinder 11 as sensed by the pressure sensor 51 is within the range of bottom pressure values upon free falling of the boom, namely, is equal to or higher than the predetermined pressure P0, the first solenoid value 81 retains a valve element position 81a by an instruction current value outputted from the first storage unit 91 and the second solenoid valve 82 retains a valve element position 82a by an instruction current value outputted from the second storage unit 92. When a boom-lowering operation is performed, a boom-lowering pilot pressure is fed from the pilot line 40 to the signal port of the selector valve 262 in the flow control valve 26 through the pilot line 84, first solenoid valve 81 and pilot line 86, so that the selector valve 262 is changed over to the selected position 26a and the pilot line 85 is cut off at the second solenoid valve 82. As a consequence, no pilot pressure arises in the pilot line 87 and the center bypass selector valve 27 retains the valve element position 27a.

When the value of a bottom pressure on the hydraulic boom cylinder 11 as sensed by the pressure sensor 51 is within the range of bottom pressure values in situations that pressing forces are applied to the boom 5, namely, is lower than the predetermined pressure P0, the first solenoid valve 81 is changed over to a selected position 81b by an instruction current value outputted from the first storage unit 91 and the second solenoid valve 82 is changed over to a selected position 82b by an instruction current value outputted from the second storage unit 92. The pilot line 84 is, therefore, cut off at the first solenoid valve 81. Accordingly, no pilot pressure arises in the pilot line 86, the flow control valve 26 is changed over to the selected position 26b, and the pilot line 40 and the pilot line 87 are brought into a state communicated with each other. When a boom-lowering operation is performed, a boom-lowering pilot pressure is, therefore, fed to the signal port of the center bypass selector valve 27 through the pilot line 40, pilot line 85, second solenoid valve 82 and the pilot line 87. As a consequence, the center bypass selector valve 27 is changed over to the selected position 27b.

When the selector valve 262 in the flow control valve 26 has been changed over to the selected position 26a and the center bypass selector valve 27 has been changed over to the selected position 27a, only the regenerated oil discharged from the bottom chamber 11a is fed to the rod chamber 11b and the boom 5 undergoes a free fall, as described in connection with the first embodiment. When the first solenoid valve 81 and second solenoid valve 82, which make up the jack-up selector valve 25, have been changed over to the selected positions 81b,82b, respectively, and the center bypass selector valve 27 has been changed over to the selected position 27b, on the other hand, the regenerated oil and the pressure oil fed from the main pump 21 are combined and fed to the rod chamber 11b and a strong pressing force such as a jack-up force for the body is produced, as described in connection with the first embodiment.

It is to be noted that the first and second storage units 91,92 also have different characteristics in this embodiment as in the above-described third embodiment, because as in the third embodiment, the jack-up selector valve 25 and the center bypass selector valve 27 are in such a relationship as being independently changed over. Especially in this embodiment, the change-over timings of the jack-up selector valve 25 and center bypass selector valve 27 can be set different from each other by providing the two storage units with different characteristics. For example, taking a look at the relationship in characteristics as illustrated in FIG. 6, their characteristics are designed such that, when the boom bottom pressure (BM/B pressure) becomes lower than the preset pressure Po as the standard, in other words, has a value smaller than the preset value Po, an instruction pressure Pi is outputted from the first storage unit 91 before it is outputted from the second storage unit 92. The selector valve 262 is, therefore, changed over before the center bypass selector valve 27. By changing over the jack-up selector valve 25 before the center bypass selector valve 27 as described above, the fourth embodiment can be operated with good energy efficiency like the third embodiment.

The hydraulic working machine according to this embodiment can also bring about similar advantageous effects as the hydraulic working machine according to the second embodiment.

(Fifth Embodiment of the Hydraulic Circuit)

Figure 7:
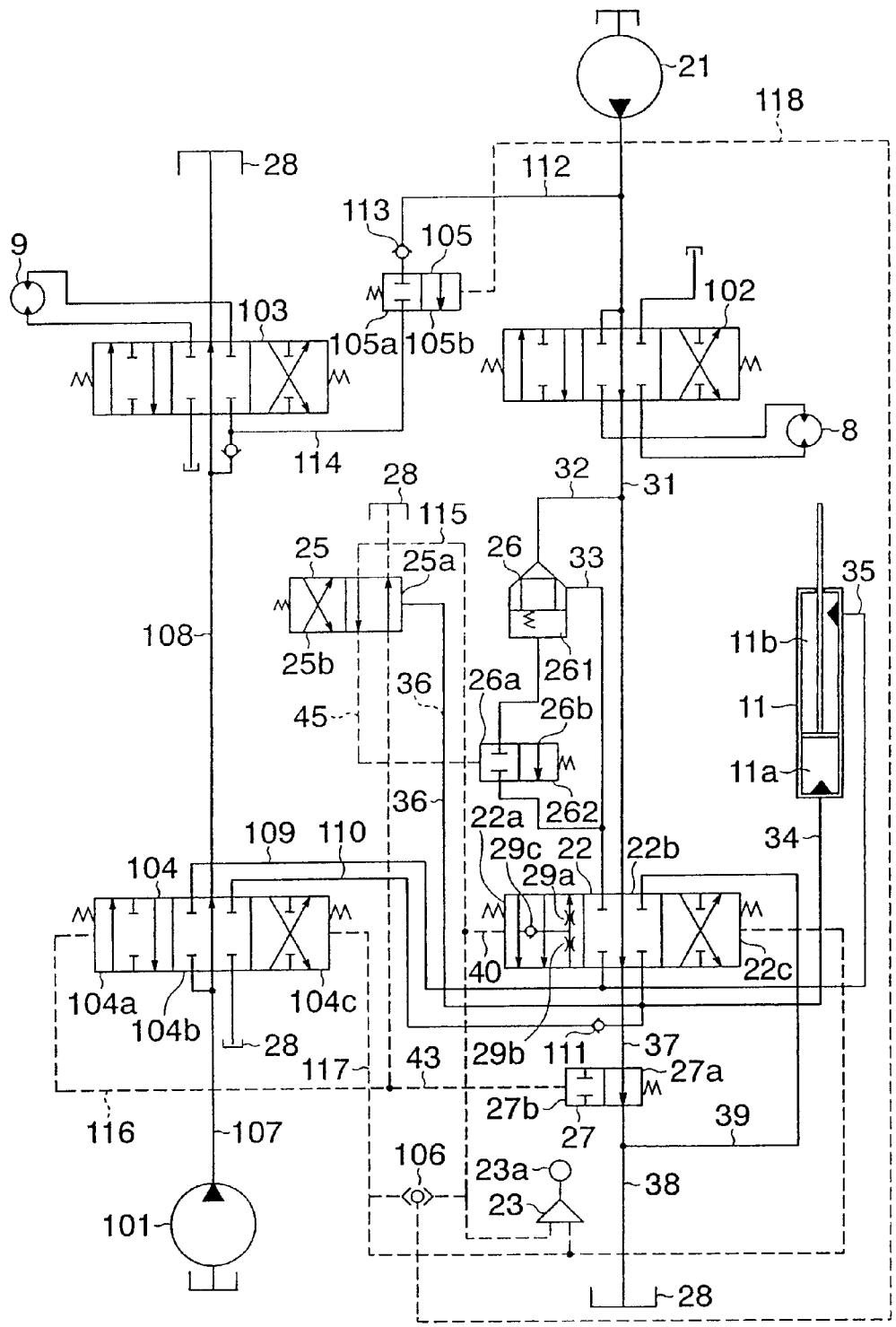
FIG. 7 is a circuit diagram of a hydraulic circuit according to a fifth embodiment.

With reference to FIG. 7, a description will next be made of the fifth embodiment of the hydraulic circuit arranged on the hydraulic working machine. FIG. 7 is a circuit diagram of the hydraulic circuit according to the fifth embodiment, and as clearly seen from this figure, the hydraulic circuit of this embodiment is characterized in that a track-unit-driving, hydraulic circuit is combined with a boom-driving, hydraulic circuit.

In FIG. 7, reference numeral 8 indicates a right-track hydraulic motor, reference numeral 9 a left-track hydraulic motor, reference numeral 101 a second main pump, reference numeral 102 a second directional control valve for controlling a flow of pressure oil to be fed from the main pump 21 to the right-track hydraulic motor 8, reference numeral 103 a third directional control valve for controlling a flow of pressure oil to be fed from the second main pump 101 to the left-track hydraulic motor 9, reference numeral 104 a fourth directional control valve for controlling a flow of pressure oil to be fed from the second main pump 101 to the hydraulic boom cylinder 11, reference numeral 105 a selector valve for feeding the pressure oil, which is fed from the first main pump 21, to the side of the left-track hydraulic motor 9 upon performing a boom-lowering operation, reference numeral 106 a shuttle valve for applying a change-over signal to the selector valve 105 when a boom operation has been performed, reference numeral 107 a line connecting the second main pump 101 and the fourth directional control valve 104 with each other, reference numeral 108 a center bypass passage connecting the second main pump 101 and the reservoir 28 with each other, reference numeral 109 a line connecting the fourth directional control valve 104 and the rod chamber 11b of the hydraulic boom cylinder 11 with each other, reference numeral 110 a line connecting the fourth directional control valve 104 and the bottom chamber 11a of the hydraulic boom cylinder 11 with each other, reference numeral 111 a check valve arranged on the line 110, reference numeral 112 a line connecting the main pump 21 and the selector valve 105 with each other, reference numeral 113 a check valve arranged on the line 112, reference numeral 114 a line connecting the selector valve 105 and the third directional control valve 103 with each other, reference numeral 115 a pilot line guiding a pilot pressure, which serves as a boom-lowering signal, to the jack-up selector valve 25, reference numeral 116 a pilot line for feeding a boom-lowering signal to the signal port of the fourth directional control valve 104, reference numeral 117 a pilot line for feeding a boom-raising signal to the signal port of the fourth directional control valve 104, and reference numeral 118 a pilot line for feeding a change-over signal to the signal port of the selector valve 105. Other elements which are the same or equivalent to corresponding elements in FIG. 2 are shown by the same reference numerals.

A description will hereinafter be made about operations of the hydraulic working machine according to the fifth embodiment constructed as described above.

When the control lever 23a is at the neutral position, the directional control valve 22 and the fourth directional control valve 104 retain the neutral position 22b and the neutral position 104b, respectively, as illustrated in FIG. 7. Accordingly, the jack-up selector valve 25 is changed over to the selected position 25a by the bottom-side pressure of the hydraulic boom cylinder 11. In this state, the pilot line 43 is in communication with the reservoir 28, so that the center bypass selector valve 27 retains the valve element position 27a and the selector valve 105 retains the valve element position 105a. Accordingly, the pressure oil delivered from the main pump 21 is guided to the reservoir 28 through the line 31, the center bypass port of the directional control valve 22, the line 37, the center bypass selector valve 27 and the line 38. Further, the pressure oil delivered from the second main pump 101 is guided to the reservoir 28 through the line 107, the line 108 and the center bypass port of the third directional control valve 103. No pressure oil is, therefore, fed to the bottom chamber 11a and rod chamber 11b of the hydraulic bottom cylinder 11.

When the control lever 23a is operated in a leftward direction as viewed in the figure, that is, in a boom-lowering direction in the above-described state, the pilot pressure which has been fed from the pilot pump 24 and reduced in pressure by the reducing valve 23b is outputted to the pilot line 40, and the directional control valve 22 is changed over to the selected position 22a. Further, this pilot pressure is guided to the pilot line 115 and then to the signal port of the selector valve 262 via the jack-up selector valve 25, so that the selector valve 262 is changed over to the selected position 26a. As a consequence, a portion of the return oil from the bottom chamber 11a is regenerated in the rod chamber 11b via the restrictor 29b, check valve 29c and line 35, and the rest of the return oil is returned to the reservoir 28 via the restrictor 29a and line 39.

When the bottom pressure is higher than the operating pressure for the jack-up selector valve 25 in the above-described situation, the jack-up selector valve 25 is maintained at the selected position 25a, so that the selected position of the flow control valve 26 is also maintained at the selected position 26a and the center bypass selector valve 27 is also maintained at the valve element position 27a. Accordingly, the pressure oil delivered from the main pump 21 is guided to the reservoir 28 through the line 31, the center bypass port of the directional control valve 22, the line 37, the center bypass selector valve 27 and the line 38, and the pressure oil delivered from the second main pump 101 is guided to the reservoir 28 through the line 107, the line 108 and the center bypass port of the third directional control valve 103. As a consequence, the pressure oil is fed neither to the bottom chamber 11a nor the rod chamber 11b of the hydraulic boom cylinder 11. Therefore, only the regenerated oil discharged from the bottom chamber 11a is fed to the rod chamber 11b, the hydraulic boom cylinder 11 contracts under the dead weight of the boom 5, and the boom 5 undergoes a free fall.

When the bottom pressure becomes lower than the operating pressure for the jack-up selector valve 25 in the situation that the control lever 23a has been operated in the boom-lowering direction, on the other hand, the jack-up selector valve 25 is changed over to the selected position 25b, so that the pilot line 45 is brought into communication with the reservoir 28 via the jack-up selector valve 25 and the selector valve 262 in the flow control valve 26 is changed over to the valve element position 26b. The pressure oil delivered from the main pump 21 is, therefore, fed to the meter-in port of the directional control valve 22 through the line 32, the flow control valve 26 and the line 33. Responsive to a change-over of the jack-up selector valve 25, the pilot pressure is fed as a boom-lowering signal to the signal port of the center bypass selector valve 27 through the pilot line 115, jack-up selector valve 25 and pilot line 43. As a consequence, the center bypass selector valve 27 is changed over to the selected position 27b, the center bypass selector valve 27 is changed over to the selected position 27b, and the boom-lowering signal is also fed to the signal port on the boom-lowering side of the fourth directional control valve 104 through the pilot line 116. The fourth directional control valve 104 is, therefore, changed over to a selected position 104a. Accordingly, the pressure oil delivered from the main pump 21 is fed to the rod chamber 11b of the hydraulic boom cylinder 11, the pressure oil delivered from the second main pump 101 is fed to the rod chamber 11b of the hydraulic boom cylinder 11 through the fourth directional control valve 104, line 109 and line 35, and the regenerated oil discharged from the bottom chamber 11a, the pressure oil fed from the main pump 21 and the pressure oil fed from the second main pump 101 are combined and fed to the rod chamber 11b. It is hence possible to produce a strong pressing force like a jack-up force for the body.

Further, the boom-operating pilot pressure is guided to the selector valve 105 via the shuttle valve 106 and line 118. Accordingly, the selector valve 105 is changed over to a selected position 105b, so that the pressure oil delivered from the main pump 21 is fed to the left-track and right-track hydraulic motors 8,9 via the second directional control valve 102 and third directional control valve 103, respectively. As a consequence, when the boom and the tracks are operated at the same time, the pressure oil from the main pump 21 is fed to the left-track and right-track motors 8,9 and the pressure oil from the second main pump 101 is fed to the hydraulic boom cylinder 11, thereby making it possible to jack up the body by the combined operation of the track operation and the boom-lowering operation.

It is to be noted that, although a hydraulically-piloted selector valve was used as the jack-up selector valve 25 in the above-described fifth embodiment, an electrohydraulic or solenoid-operated selector valve can also be used as in the hydraulic working machines according to the second to fourth embodiments.

(Sixth Embodiment of the Hydraulic Circuit)

Figure 8:
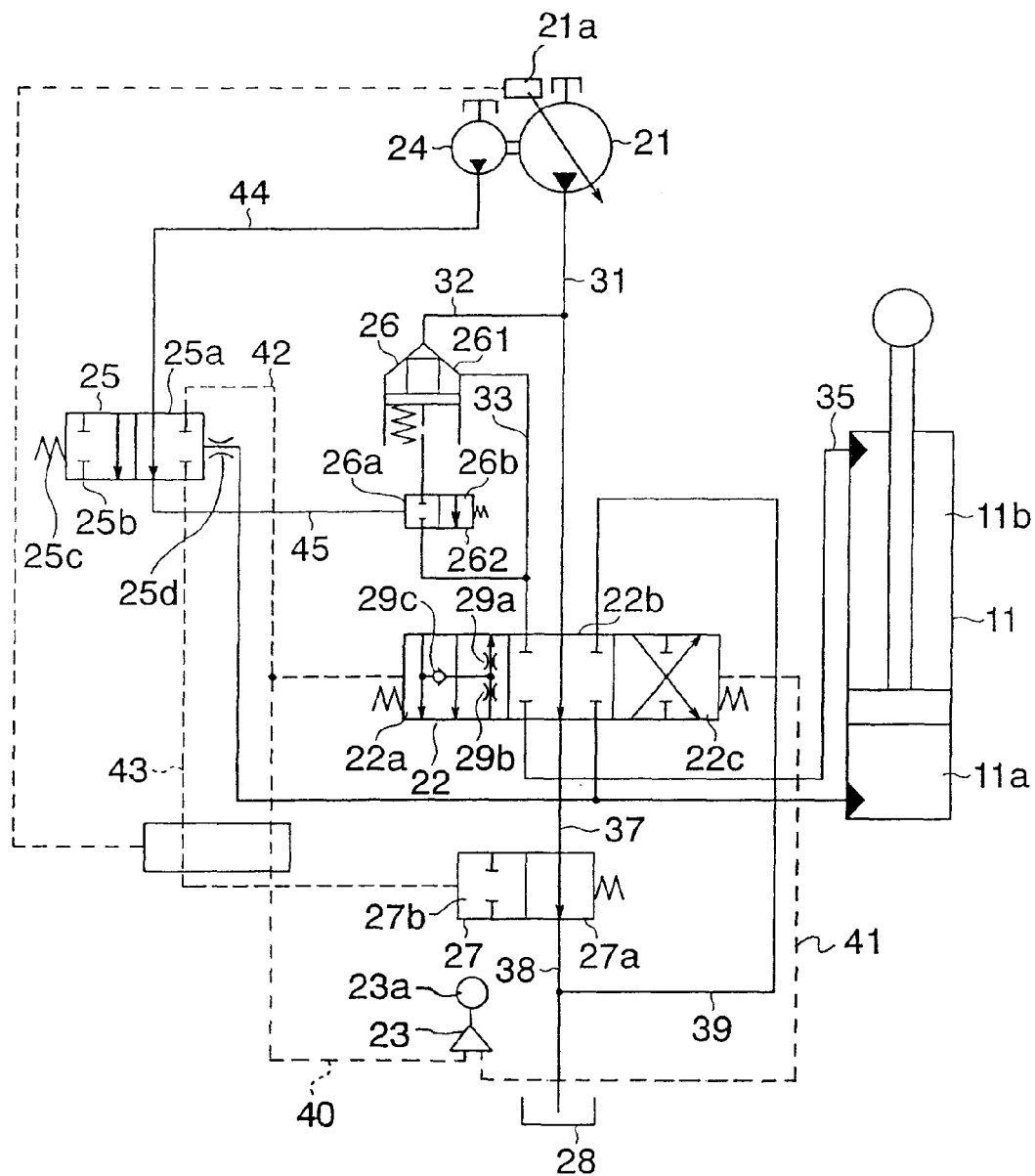
FIG. 8 is a circuit diagram of a hydraulic circuit according to a sixth embodiment.
Figure 9:
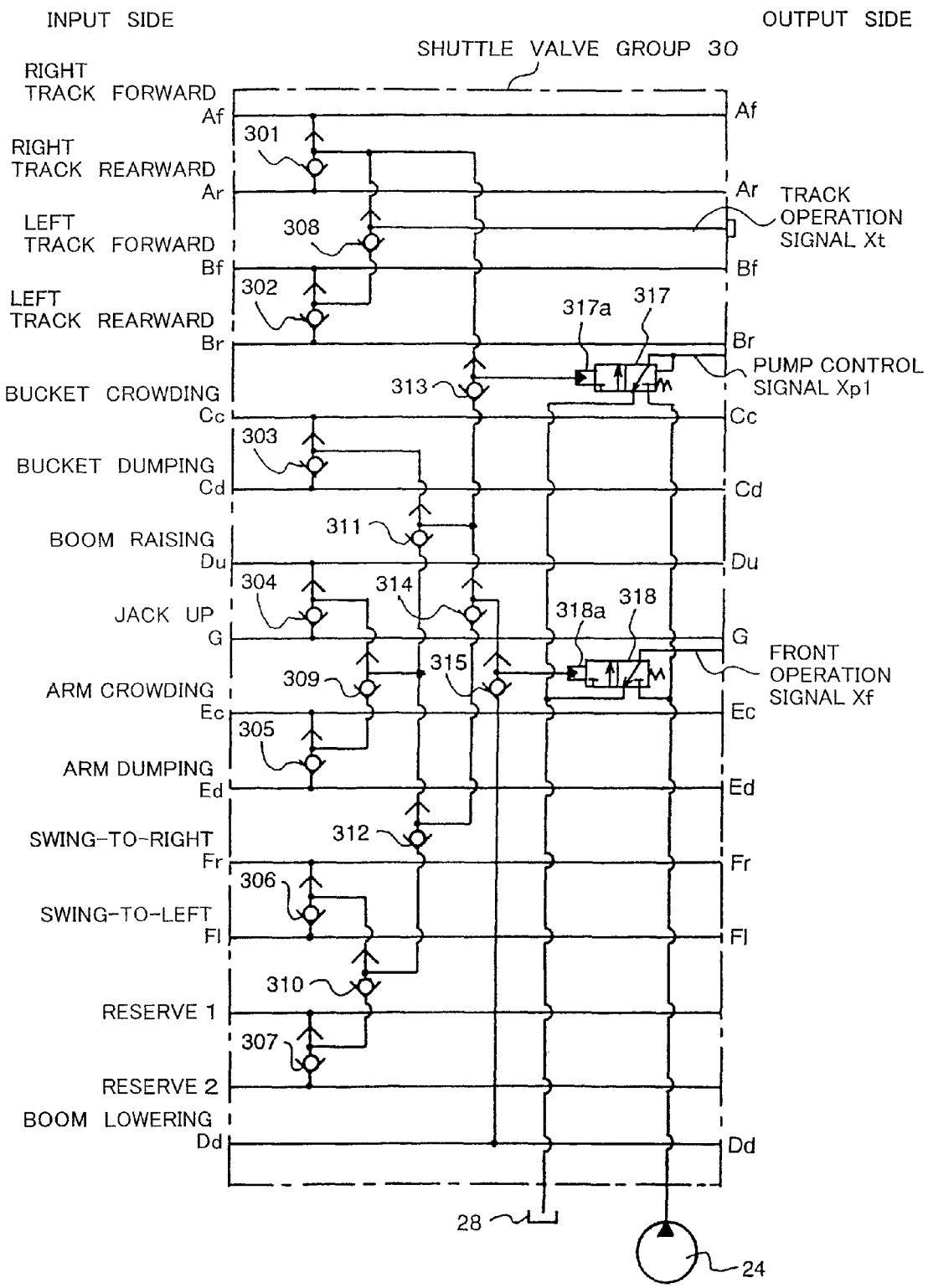
FIG. 9 is a circuit diagram showing essential parts of a hydraulic circuit according to the sixth embodiment.

With reference to FIG. 8 and FIG. 9, a description will next be made of the sixth embodiment of the hydraulic circuit arranged on the hydraulic working machine. FIG. 8 is a fragmentary circuit diagram of the hydraulic circuit according to the sixth embodiment, and FIG. 9 is a construction diagram of a shuttle valve group arranged in the hydraulic circuit of the sixth embodiment. As clearly seen from these figures, the hydraulic circuit of this embodiment is characterized in that a hydraulically-piloted selector valve is arranged as a jack-up selector valve and oil pressure from one variable displacement hydraulic pump is fed to a hydraulic cylinder.

Different from the first embodiment shown in FIG. 2, the hydraulic circuit of this embodiment is primarily constructed, as illustrated in FIG. 2, of the variable displacement hydraulic pump (main pump) 21, a regulator (swash angle control means) 21a for controlling the displacement of the variable displacement hydraulic pump 21, the double-acting hydraulic cylinder 11 arranged for extension or contraction by the pressure oil, which is delivered from the variable displacement hydraulic pump 21, to drive the boom (working element) 5, the directional control valve 22 for controlling flows of pressure oil to be fed from the variable displacement hydraulic pump 21 to the bottom chamber 11a and rod changer 11b of the hydraulic boom cylinder (actuator) 11, the pilot control unit 23 for performing a change-over control of the directional control valve 22, the pilot pump 24, the jack-up selector valve 25 for controlling a flow of pressure oil delivered from the pilot pump 24, the flow control valve 26 connected on the upstream side of the directional control valve 22 to the meter-in port of the directional control valve 22 and change-over controlled by the jack-up selector valve 25, the center bypass selector valve 27 connected on the downstream side of the directional control valve 22 to the center bypass port of the directional control valve 22 and change-over controlled by the jack-up selector valve 25, the reservoir 28, and a shuttle valve group (swash angle instruction means) 30 for outputting swash angle control signals to the regulator 21a in response to signals from the pilot control unit 23 and another pilot control unit (not shown)

Arranged as the directional control valve 22 is one having the regeneration circuit, which is composed of the restrictors 29a,29b and the check valve 29c.

As depicted in FIG. 3, the pilot control unit 23 is constructed of the control lever 23a, and the boom-lowering-side reducing valve 23b and boom-raising-side reducing valve 23c, which are changed over by the control lever 23a.

The jack-up selector valve 25 is provided at the pilot port thereof with an anti-hunting restrictor 25d.

The flow control valve 26 is composed of the poppet valve 261 and the pilot-operated selector valve 262 for communicating the back pressure chamber of the poppet valve 261 and the pump port side of the directional control valve 22 with each other or cutting them off from each other.

The shuttle valve group 30 is constructed, as depicted in FIG. 9, of a combination of shuttle valves 301-315 and hydraulic selector valves 317,318. It is to be noted that as the shuttle valve group 30, the individual shuttle valves and hydraulic selector valves connected together through lines can be used or a block with the required shuttle valves and hydraulic selector valves integrally assembled therein can also be used.

Among the shuttle valves 301-315, the shuttle valves 301-307 are arranged in a first stage of the shuttle valve group 30. The shuttle valve 301 selects the higher one of a right-track forward control signal pressure Af and a right-track rearward control signal pressure Ar, the shuttle valve 302 selects the higher one of a left-track forward control signal pressure Bf and a left-track rearward control signal pressure Br, the shuttle valve 303 selects the higher one of a bucket-crowding control signal pressure Cc and a bucket-dumping control signal pressure Cd, the shuttle valve 304 selects the higher one of a boom-raising control signal pressure Du and a jack-up control signal pressure G, the shuttle valve 305 selects the higher one of an arm-crowding control signal pressure Ec and an arm-dumping control signal pressure Ed, the shuttle valve 306 selects the higher one of a swing-to-right control signal pressure Fr and a swing-to-left control signal pressure Fl, and the shuttle valve 307 selects the higher one of control signal pressures from paired pilot valves in a reserve pilot control unit arranged when a reserve actuator is connected to a reserve directional control valve.

The shuttle valves 308-310 are arranged in a second stage of the shuttle valve group 30. The shuttle valve 308 selects the higher one of the control signal pressures selected by the shuttle valve 301 and shuttle valve 302, respectively, in the first stage, the shuttle valve 309 selects the higher one of the control signal pressures selected by the shuttle valve 304 and shuttle valve 305, respectively, in the first stage, and the shuttle valve 310 selects the higher one of the control signal pressures selected by the shuttle valve 306 and shuttle valve 307, respectively, in the first stage.

The shuttle valves 311,312 are arranged in a third stage of the shuttle valve group 30. The shuttle valve 311 selects the higher one of the control signal pressures selected by the shuttle valve 303 in the first stage and the shuttle valve 309 in the second stage, respectively, and the shuttle valve 312 selects the higher one of the control signal pressures selected by the shuttle valve 309 and shuttle valve 310 in the second stage, respectively.

The shuttle valves 313,314 are arranged in a fourth stage of the shuttle valve group 30. The shuttle valve 313 selects the higher one of the control signal pressures selected by the shuttle valve 301 in the first stage and the shuttle valve 311 in the third stage, respectively, and the shuttle valve 304 selects the higher one of the control signal pressures selected by the shuttle valve 311 and shuttle valve 312 in the third stage, respectively.

The shuttle valve 315 is arranged in a fifth stage of the shuttle valve group 30, and selects the higher one of the control signal pressure selected by the shuttle valve 314 in the fourth stage and the boom-lowering control signal pressure Dd.

The hydraulic selector valve 317 is a proportional reducing valve which, based on the highest pressure selected at the shuttle valve 313 and guided to a pressure-receiving part 317a, is operated to produce a control signal pressure (pump control signal Xp1) from the pressure of the pilot pump 24. When the highest pressure selected at the shuttle valve 313 is lower than the reservoir pressure, this hydraulic selector valve 317 is at the position indicated in the figure to reduce the control signal pressure to the reservoir pressure. When the highest pressure selected at the shuttle valve 313 becomes equal to or higher than the reservoir pressure, on the other hand, the hydraulic selector valve 317 is changed over from the position indicated in the figure, and outputs the pressure of the pilot pump 24 after reducing it to a control signal pressure corresponding to the level of the highest pressure. The regulator 21a for the variable displacement hydraulic pump 21 is operated by the control signal pressure (pump control signal Xp1).

The regulator 21a has a characteristic that it increases the swash angle of the variable displacement hydraulic pump 21 as the pressure of the pump control signal Xp1 rises, and, when a pump control signal Xp1 is applied, the regulator 21a increases or decreases the delivery rate of the variable displacement hydraulic pump 21 depending on the pump control signal Xp1. Accordingly, when the pilot control unit 23 is operated, the directional control valve 22 is changed over, pressure oil is delivered from the variable displacement hydraulic pump 21 at a flow rate corresponding to a control signal pressure (a stroke of the pilot control unit 23), and the pressure oil is fed to the bottom chamber 11a or rod chamber 11b of the hydraulic boom cylinder 11 to cause an extension or contraction of the hydraulic boom cylinder 11.

The hydraulic selector valve 318 is a proportional reducing valve which, based on the highest pressure selected at the shuttle valve 315 and guided to a pressure-receiving part 318a, is operated to produce a control signal pressure (front operation Xf) from the pressure of the pilot pump 24. When the highest pressure selected at the shuttle valve 315 is lower than the reservoir pressure, this hydraulic selector valve 318 is at the position indicated in the figure to reduce the control signal pressure to the reservoir pressure. When the highest pressure selected at the shuttle valve 315 becomes equal to or higher than the reservoir pressure, on the other hand, the hydraulic selector valve 318 is changed over from the position indicated in the figure, and outputs the pressure of the pilot pump 24 after reducing it to a control signal pressure corresponding to the level of the highest pressure. A swing brake cylinder and travel communication valve (not shown) are operated by this control signal pressure (front operation Xf).

This sixth embodiment is basically different from the first embodiment in the construction that the regulator (swash angle control means) 21a and the shuttle valve group (swash angle instruction means) 30 for outputting a swash angle control signal to the regulator 21a are arranged. A description will, therefore, be made only about operations relevant to the construction different from the first embodiment.

When the control lever 23a is operated in the leftward direction as viewed in the figure, that is, in the boom-lowering direction from the situation that the control lever 23a is at the neutral position and no pulling force is applied on the hydraulic boom cylinder 11, the boom 5 is caused to turn in the downward direction (undergoes a so-called free fall).

During the free fall of the boom 5, the pressure oil produced at the pilot control unit 23 does not enter a jack-up signal input port G of the shuttle valve group 30 but enters a boom-lowering signal input port Dd. The pressure at the jack-up signal input port G is subjected together with other plural control signals to highest pressure selection, and the thus-selected highest pressure changes over the hydraulic selector valve 317. When no other pilot control unit (not shown) is operated, however, the hydraulic selector valve 317 is not changed over and is retained in the state of FIG. 9. As a result, the reservoir pressure is outputted as a pump control signal Xp1 from the shuttle valve group 30, and the variable displacement hydraulic pump 21 is decreasingly controlled via the regulator 21a.

When the bottom pressure is lower than the change-over pressure for the jack-up selector valve 25 in the situation that the control lever 23a has been operated in the boom-lowering direction, on the other hand, the pressure oil fed from the variable displacement hydraulic pump 21 to the meter-in port of the directional control valve 22 through the line 33 is fed together with the regenerated oil, which has been discharged from the bottom chamber 11a, to the rod chamber 11b of the hydraulic boom cylinder 11 through the line 35 as in the first embodiment, thereby making it possible to produce a strong pressing force such as a jack-up force for the body.

Upon performing a jack-up, the pressure oil produced at the pilot control unit 23 enters the jack-up signal input port G of the shuttle valve group 30 and is subjected together with plural other control signals to highest pressure selection, and the thus-selected highest pressure changes over the hydraulic selector valve 317. As a result, a pressure corresponding to the highest pressure is outputted as a pump control signal Xp1 from the shuttle valve group 30, and the variable displacement hydraulic pump 21 is increasingly controlled via the regulator 21a.

When the control lever 23a is operated in the rightward direction as viewed in the figure, that is, in the boom-raising direction, on the other hand, a boom-raising pilot pressure is outputted to the pilot line 41 by the pressure oil fed from the pilot pump 24, so that the directional control valve 22 is changed over to the selected position 22c. As a result, the pressure oil discharged from the rod chamber 11b is caused to return to the reservoir 28 through the line 35, directional control valve 22 and line 39. Accordingly, the bottom pressure becomes lower than the operation pressure for the jack-up selector valve 25, the jack-up selector valve 25 is changed over to the selected position 25b, and the flow control valve 26 is changed over to the selected position 26b. Therefore, the pressure oil fed from the variable displacement hydraulic pump 21 to the meter-in port of the directional control valve 22 through the line 32, flow control valve 26 and line 33 is fed to the bottom chamber 11a through the line 34, the hydraulic boom cylinder 11 is caused to extend, and the boom 5 is caused to turn in the upward direction.

Upon performing the boom-raising operation, the pressure oil produced at the pilot control unit 23 enters the boom-raising signal input port Du of the shuttle valve group 30 and is subjected together with plural other control signals to highest pressure selection, and the thus-selected highest pressure changes over the hydraulic selector valve 317. As a result, a pressure corresponding to the highest pressure is outputted as a pump control signal Xp1 from the shuttle valve group 30, and the variable displacement hydraulic pump 21 is increasingly controlled via the regulator 21a.

The hydraulic working machine according to this embodiment is designed to monitor changes in the bottom pressure of the hydraulic boom cylinder 11 and, when the bottom pressure on the hydraulic boom cylinder 11 is equal to or higher than the predetermined pressure upon lowering the boom, to change over the jack-up selector valve 25 to the selected position 25a, and accordingly, to change over the selector valve 262 in the flow control valve 26 to the selected position 26a and the center bypass selector valve 27 to the valve element position 27a such that the pressure oil delivered from the variable displacement hydraulic pump 21 is not fed to the rod chamber 11b of the hydraulic boom cylinder 11. It is, therefore, possible to reduce the horse power consumption of the pump upon performing a simple boom-lowering operation which does not require a pressing force for jacking up the body. As the pressure oil delivered from the variable displacement hydraulic pump 21 is not fed to the rod chamber 11 of the hydraulic boom cylinder 11 upon performing a simple boom-lowering operation, it is possible to relatively increase the pressure oil to be fed from the variable displacement hydraulic pump 21 to the hydraulic arm cylinder 12 and hydraulic bucket cylinder 13 upon operating the boom 5 in combination with one or more other working elements, for example, the arm 6 and/or bucket 7. This makes it possible to improve the energy efficiency of the hydraulic working machine. When the bottom pressure on the hydraulic boom cylinder 11 is lower than the predetermined pressure upon lowering the boom, on the other hand, the jack-up selector valve 25 is changed over to the selected position 25b, and as a result, the selector valve 262 in the flow control valve 26 is changed over to the selected position 26b and the center bypass selector valve 27 is changed over to the selected position 27b such that the pressure oil delivered from the variable displacement hydraulic pump 21 is fed to the rod chamber 11b of the hydraulic boom cylinder 11. It is, therefore, possible to produce a large pressing force at the boom 5 and to jack up the body.

The displacement of the variable displacement hydraulic pump 21 is decreasingly controlled when the bottom pressure on the hydraulic boom cylinder 11 is equal to or higher than the predetermined pressure upon lowering the boom 5, but the displacement of the variable displacement hydraulic pump 21 is increasingly controlled by the regulator 21a when the bottom pressure on the hydraulic boom cylinder 11 is lower than the predetermined pressure upon lowering the boom 5. It is, therefore, possible to reduce the horse power consumption of the pump upon performing a simple boom-lowering operation. In addition, the pressure oil can be promptly fed as much as needed to the hydraulic boom cylinder 11 upon performing a pressing operation of the boom 5. It is, accordingly, possible to smooth effect a switchover from a simple lowering operation of the boom 5 to a pressing operation.

Other elements, which have not been described specifically, and their operations are constructed likewise and performed similarly as in the above-described first embodiment.

It is also to be noted that, although the hydraulic circuit for driving the hydraulic boom cylinder 11 was described by way of example in each of the above-described embodiments, the gist of the present invention is not limited to such hydraulic circuits but hydraulic circuits for driving hydraulic cylinders for other working elements can be formed into similar constructions as described above.

For example, the hydraulic arm cylinder 12 can be mentioned as a hydraulic cylinder for another working element. As an operation for performing a jack-up by this hydraulic arm cylinder 12, the arm 6 is firstly placed on a side more forward than a location where the arm 6 and the boom 6 are connected with each other, the hydraulic arm cylinder 12 is caused to extend with the bucket 7 pressed against the ground, and the arm 6 is caused to turn toward the seat until the arm stands upright. To perform this operation, the pressure oil is guided to the side of the unillustrated bottom chamber of the hydraulic arm cylinder 12 such that the hydraulic arm cylinder 12 is caused to extend. A strong force can be produced upon performing a jack-up by constructing such that the pressure in the rod chamber of the hydraulic arm cylinder 12 is monitored at this time and the pressure oil is guided to the bottom chamber of the arm cylinder when the pressure in the rod chamber is low.

(Seventh Embodiment of the Hydraulic Circuit)

Figure 10:
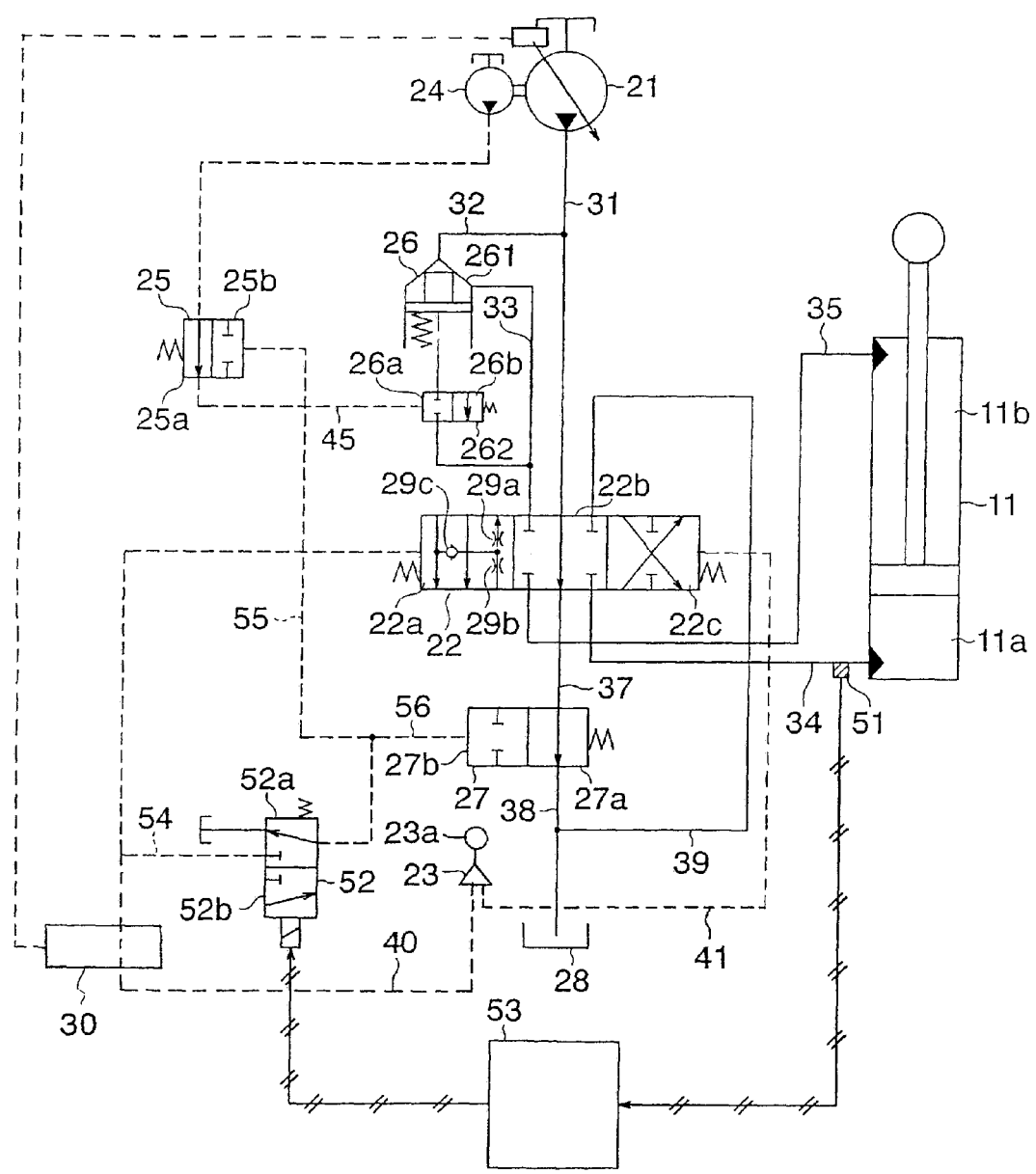
FIG. 10 is a circuit diagram of a hydraulic circuit according to a seventh embodiment.

With reference to FIG. 10, a description will next be made of the seventh embodiment of the hydraulic circuit arranged on the hydraulic working machine. FIG. 10 is a circuit diagram of the hydraulic circuit according to the seventh embodiment, and as clearly seen from this figure, the hydraulic circuit of this embodiment is characterized in that change-over controls of the jack-up selector valve and center bypass selector valve are performed by a solenoid valve.

In FIG. 10, reference numeral 51 indicates the pressure sensor for sensing a bottom pressure on the hydraulic boom cylinder 11, reference numeral 52 the solenoid valve for changing over the jack-up selector valve 25 and center bypass selector valve 27, reference numeral 53 the controller for receiving an output signal from the pressure sensor 51 and outputting an instruction current value to be fed to the signal input part of the solenoid valve 52, reference numeral 54 the line branching out from the pilot line 40 and communicating to the solenoid valve 52, reference numeral 55 the pilot line connecting the signal port of the jack-up selector valve 25 and the solenoid valve 52 with each other, and reference numeral 56 the pilot line connecting the signal port of the center bypass selector valve 27 and the solenoid valve 52 with each other. Other elements which are the same or equivalent to corresponding elements in FIG. 8 are shown by the same reference numerals.

Stored in the controller 53 is the relationship between the values of bottom pressures on the hydraulic boom cylinder 11 as detected by the pressure sensor 51 and the instruction current values to be fed to the signal input part of the solenoid valve 52. When a bottom pressure value detected by the pressure sensor 51 is within the range of bottom pressure values upon free falling of the boom, namely, is equal to or higher than the predetermined pressure P0, the solenoid valve 52 retains the valve element position 52a. When a bottom pressure value detected by the pressure sensor 51 is within the range of bottom pressures in the situations that pressing forces are applied to the boom 5, namely, is lower than the predetermined pressure P0, on the other hand, an instruction current is outputted to change over the solenoid valve 52 to the selected position 52b.

When the solenoid valve 52 retains the valve element position 52a, a pilot pressure which serves as a boom-lowering signal is cut off at the solenoid valve 52 and no pilot pressure arises in the pilot lines 55,56. Accordingly, the jack-up selector valve 25 retains the valve element position 25a, so that the selector valve 262 in the flow control valve 26 is changed over to the selected position 26a and the center bypass selector valve 27 retains the valve element position 27a. When the solenoid valve 52 is changed over to the selected position 52b to perform a boom operation, on the other hand, a pilot pressure which serves as a boom-lowering signal is fed to the pilot lines 55,56 via the solenoid valve 52. Accordingly, the jack-up selector valve 25 is changed over to the selected position 25b, so that the selector valve 262 in the flow control valve 26 is changed over to the selected position 26b and the center bypass selector valve 27 is changed over to the selected position 27b.

When the selector valve 262 has been changed over to the selected position 26a and the center bypass selector valve 27 retains the valve element position 27a, the pressure oil to be fed to the rod chamber 11b consists solely of the regenerated oil discharged from the bottom chamber 11a and the boom 5 undergoes a free fall, as described in connection with the first embodiment. In this case, a pump control signal Xp1 corresponding to the reservoir pressure is outputted from the shuttle valve group 30 to the regulator 21a, and the displacement of the variable displacement hydraulic pump 21 is decreasingly controlled. When the jack-up selector valve 25 has been changed over to the selected position 25b and the center bypass selector valve 27 has been changed over to the selected position 27b, on the other hand, the regenerated oil and the pressure oil fed from the variable displacement hydraulic pump 21 are combined and fed to the rod chamber 11b and a strong pressing force such as a jack-up force for the body can be obtained, as described in connection with the first embodiment. In this case, a pump control signal Xp1 corresponding to the highest pressure selected at the shuttle valve group 30 is outputted to the regulator 21a from the shuttle valve group 30, and the displacement of the variable displacement hydraulic pump 21 is increasingly controlled.

The hydraulic working machine according to this embodiment can bring about similar advantageous effects as the hydraulic working machine according to the sixth embodiment. In addition, it can omit at least the line which connects the bottom chamber 11a of the hydraulic boom cylinder 11 and the signal port of the jack-up selector valve 25 with each other, thereby making it possible to achieve simplification of the hydraulic circuit.

(Eighth Embodiment of the Hydraulic Circuit)

Figure 11:
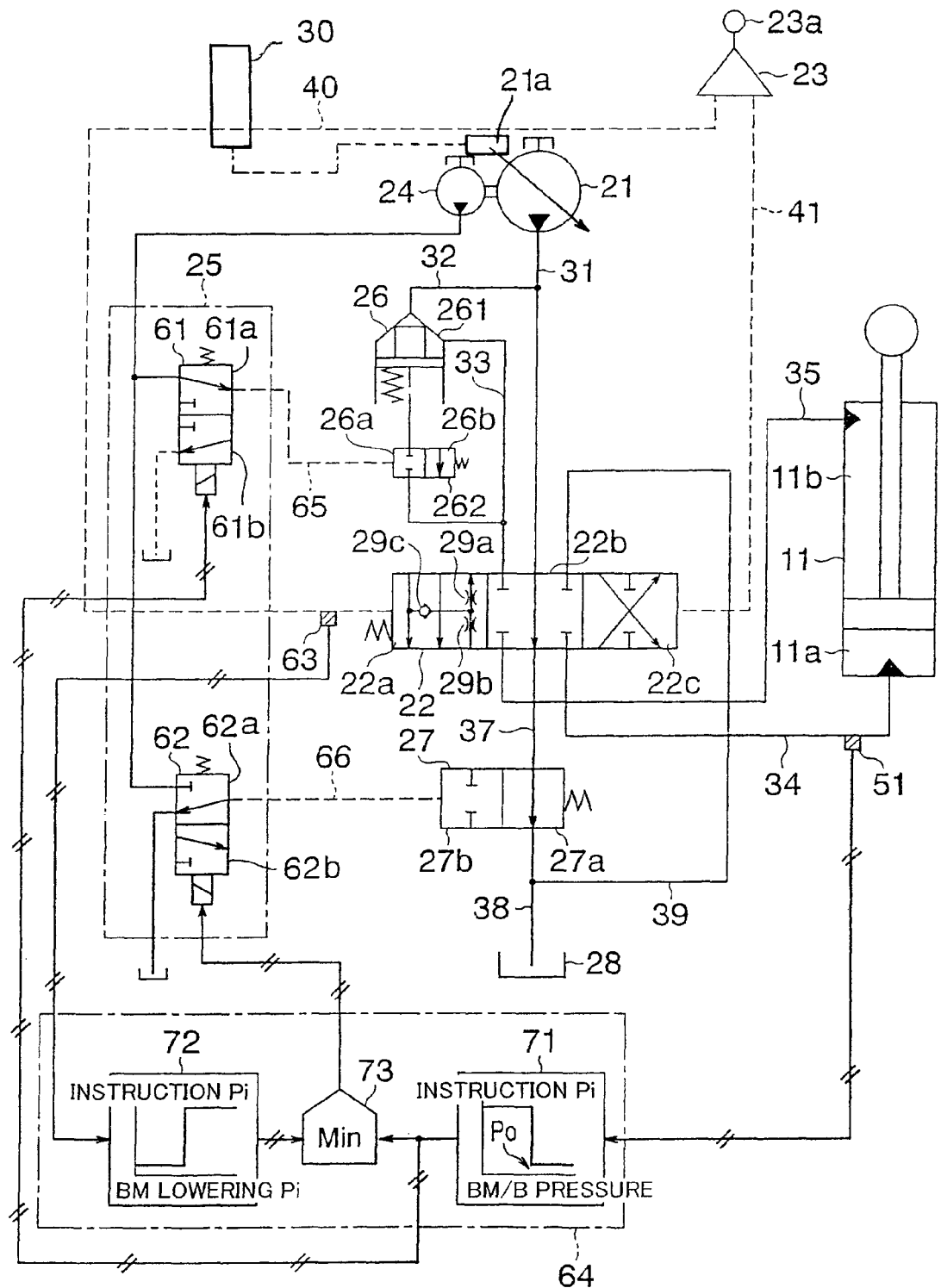
FIG. 11 is a circuit diagram of a hydraulic circuit according to an eighth embodiment.

With reference to FIG. 11, a description will next be made of the eighth embodiment of the hydraulic circuit arranged on the hydraulic working machine. FIG. 11 is a circuit diagram of the hydraulic circuit according to the eighth embodiment, and as clearly seen from this figure, the hydraulic circuit of this embodiment is characterized in that two solenoid valves are arranged as a jack-up selector valve, and change-over controls of these two solenoid valves are performed based on the bottom pressure on the hydraulic boom cylinder and the pilot pressure to the directional control valve.

In FIG. 11, reference numeral 51 indicates the first pressure sensor for sensing a bottom pressure on the hydraulic boom cylinder 11, reference numerals 61,62 the first and second solenoid valves which make up the jack-up selector valve, reference numeral 63 the second pressure sensor for sensing a pilot pressure in the pilot line 40, reference numeral 64 the controller for receiving an output signal from the first pressure sensor 51 and an output signal from the second pressure sensor 63 and outputting instruction current values to change over the selected positions of the first and second solenoid valves 61,62, reference numeral 65 the pilot line connecting the first solenoid valve 61 and the signal port of the selector valve 262 in the flow control valve 26 with each other, and reference numeral 66 the pilot line connecting the second solenoid valve 62 and the signal port of the center bypass selector valve 27 with each other. Other elements which are the same or equivalent to corresponding elements in FIG. 8 are shown by the same reference numerals.

The controller 64 is constructed, as depicted in FIG. 11, of the first storage unit 71 in which the relationship between the values of bottom pressures on the hydraulic boom cylinder 11 as sensed by the first pressure sensor 51 and the instruction current values to be fed to the signal input parts of the first and second solenoid valves 61,62 is stored, the second storage unit 72 in which the relationship between pilot pressures (boom-lowering signals) in the pilot line 40 as sensed by the second pressure sensor 63 and the instruction current values to be fed to the signal input part of the first solenoid valve 62 is stored, and the lowest selection circuit 73 for selecting the lower one of an instruction current value outputted from the first storage unit 71 and an instruction current value outputted from the second storage unit 72 and feeding it to the signal input part of the first solenoid value 62.

According to the controller 64 in this embodiment, when the value of a bottom pressure on the hydraulic boom cylinder 11 as sensed by the pressure sensor 51 is within the range of bottom pressure values upon free falling of the boom, namely, is equal to or higher than the predetermined pressure P0, an instruction current value outputted from the first storage unit 71 is a small value so that the first solenoid valve 61 retains the valve element position 61a, and irrespective of the level of an instruction current outputted from the second storage unit 72, the instruction current of the small value is outputted from the lowest selection circuit 73. Therefore, the second solenoid valve 62 also retains the valve element position 62a. As the pressure oil delivered from the pilot pump 24 is hence fed to the signal port of the selector valve 262 in the flow control valve 26 via the first solenoid valve 61 and the pilot line 65, the selector valve 262 is changed over to the selected position 26a. Further, the pressure oil delivered from the pilot pump 24 is cut off at the second solenoid valve 62, so that no pilot pressure arises in the pilot line 66 and the center bypass selector valve 27 retains the valve element position 27a.

When the value of a bottom pressure on the hydraulic boom cylinder 11 as sensed by the pressure sensor 51 is within the range of bottom pressure values in situations that pressing forces are applied to the boom 5, namely, is lower than the predetermined pressure P0, an instruction current value outputted from the first storage unit 71 is a large value so that the first solenoid valve 61 is changed over to the selected position 61b. From the lowest selection circuit 73, a current corresponding to an instruction current outputted from the second storage unit 72 is also outputted. When a boom-lowering operation is performed, the second solenoid valve 62 and the center bypass selector valve 27 are, therefore, changed over to the selected position 62b and the selected position 27b, respectively. When no boom-lowering operation is performed, on the other hand, the second solenoid valve 62 retains the valve element position 62a so that the center bypass selector valve 27 retains the valve element position 27a.

When the selector valve 262 in the flow control valve 26 has been changed over to the selected position 26a and the center bypass selector valve 27 retains the valve element position 27a, only the regenerated oil discharged from the bottom chamber 11a is fed to the rod chamber 11b and the boom 5 undergoes a free fall, as described in connection with the first embodiment. In this case, a pump control signal Xp1 corresponding to the reservoir pressure is outputted from the shuttle valve group 30 to the regulator 21a, and the displacement of the variable displacement hydraulic pump 21 is decreasingly controlled. When the valve element positions of the first solenoid valve 61 and second solenoid valve 62, which make up the jack-up selector valve 25, have been changed over to the selected positions 61b,62b, respectively, and the center bypass selector valve 27 has been changed over to the selected position 27b, on the other hand, the regenerated oil and the pressure oil fed from the variable displacement hydraulic pump 21 are combined and fed to the rod chamber 11b and a strong pressing force such as a jack-up force for the body is produced, as described in connection with the first embodiment. In this case, a pump control signal Xp1 corresponding to the highest pressure selected at the shuttle valve group 30 is outputted from the shuttle valve group 30 to the regulator 21a, and the displacement of the variable displacement hydraulic pump 21 is increasingly controlled.

The hydraulic working machine according to this embodiment can also bring about similar advantageous effects as the hydraulic working machine according to the seventh embodiment.

(Ninth Embodiment of the Hydraulic Circuit)

Figure 12:
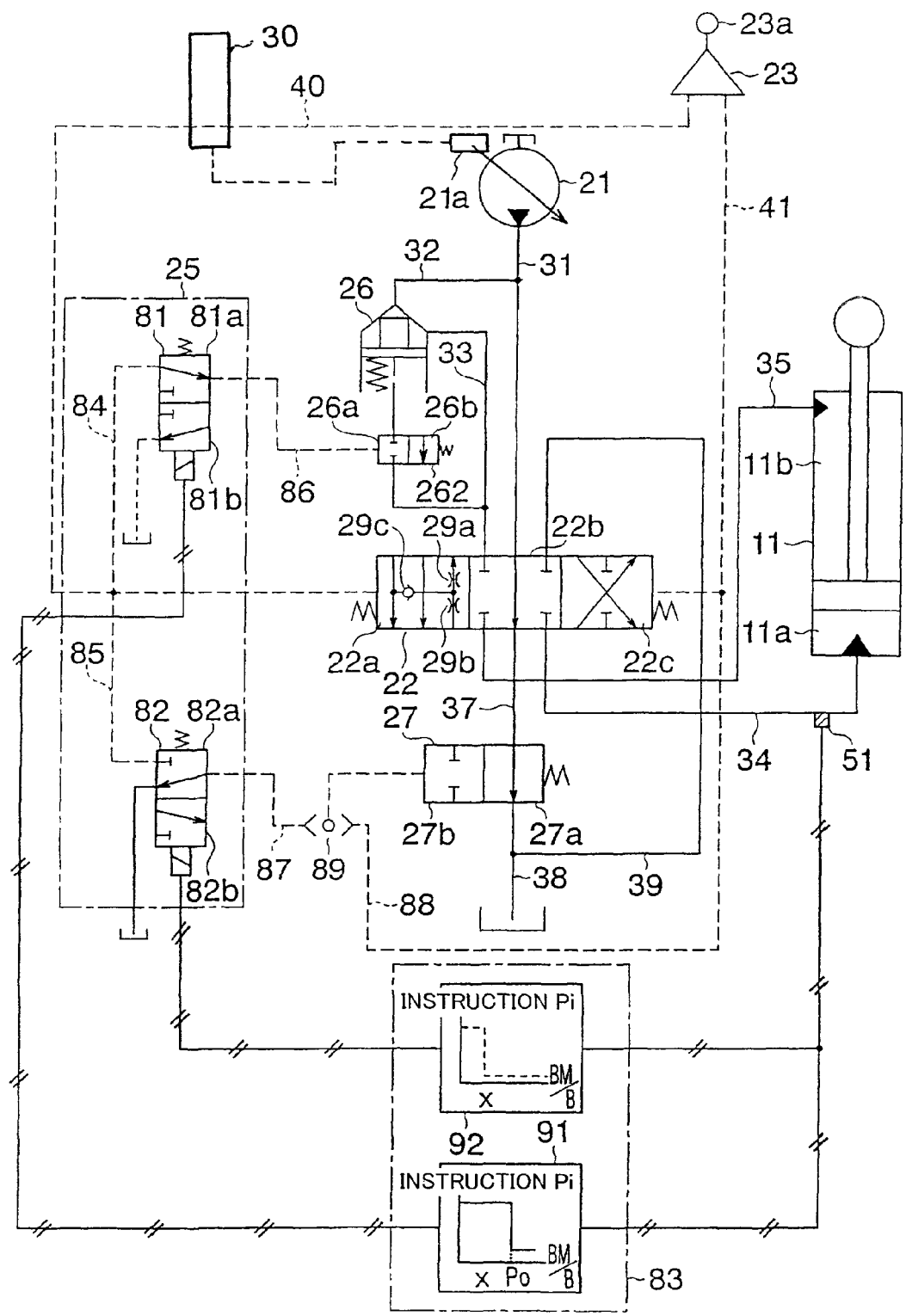
FIG. 12 is a circuit diagram of a hydraulic circuit according to a ninth embodiment.

With reference to FIG. 12, a description will next be made of the fourth embodiment of the hydraulic circuit arranged on the hydraulic working machine. FIG. 12 is a circuit diagram of the hydraulic circuit according to the ninth embodiment, and as clearly seen from this figure, the hydraulic circuit of this embodiment is characterized in that change-over controls of the directional control valve 22, flow control valve 26 and center bypass selector valve 27 are performed by a pilot pressure reduced in pressure by the reducing valve 23b constituting the pilot control unit 23, namely, a boom-lowering signal.

In FIG. 12, reference numeral 51 indicates the first pressure sensor for sensing a bottom pressure on the hydraulic boom cylinder 11, reference numerals 81,82 the first and second solenoid valves which make up the jack-up selector valve, reference numeral 83 the controller for receiving an output signal from the first pressure sensor 51 and outputting instruction current values to change over the selected positions of the first and second solenoid valves 81,82, reference numeral 84 the pilot line branching out from the pilot line 40 and connecting it to the first solenoid valve 81, reference numeral 85 the pilot line branching out from the pilot line 40 and connecting it to the second solenoid valve 82, reference numeral 86 the pilot line connecting the first solenoid valve 81 and the signal port of the selector valve 262 in the flow control valve 26 with each other, reference numeral 87 the pilot line connecting the second solenoid valve 82 and the signal port of the center bypass selector valve 27 with each other, reference numeral 88 the pilot line connecting the second solenoid valve 82 and the boom-raising, reducing valve 23c arranged in the pilot control unit 23 with each other, and numeral 89 the check valve arranged at the point of connection between the pilot line 87 and the pilot line 88. Other elements which are the same or equivalent to corresponding elements in FIG. 8 are shown by the same reference numerals.

The controller 83 is constructed, as depicted in FIG. 12, of the first storage unit 91 in which the relationship between the values of bottom pressures on the hydraulic boom cylinder 11 as sensed by the first pressure sensor 51 and the instruction current value to be fed to the signal input part of the first solenoid valve 81 is stored, and the second storage unit 92 in which the relationship between the values of bottom pressures on the hydraulic boom cylinder 11 as sensed by the first pressure sensor 51 and the instruction current value to be fed to the signal input part of the second solenoid valve 82 is stored.

According to the controller 83 in this embodiment, when the value of a bottom pressure on the hydraulic boom cylinder 11 as sensed by the pressure sensor 51 is within the range of bottom pressure values upon free falling of the boom, namely, is equal to or higher than the predetermined pressure P0, the first solenoid value 81 retains the valve element position 81a by an instruction current value outputted from the first storage unit 91 and the second solenoid valve 82 retains the valve element position 82a by an instruction current value outputted from the second storage unit 92. When a boom-lowering operation is performed, a boom-lowering pilot pressure is fed from the pilot line 40 to the signal port of the selector valve 262 in the flow control valve 26 through the pilot line 84, first solenoid valve 81 and pilot line 86, so that the selector valve 262 is changed over to the selected position 26a and the pilot line 85 is cut off at the second solenoid valve 82. As a consequence, no pilot pressure arises in the pilot line 87 and the center bypass selector valve 27 retains the valve element position 27a.

When the value of a bottom pressure on the hydraulic boom cylinder 11 as sensed by the pressure sensor 51 is within the range of bottom pressure values in situations that pressing forces are applied to the boom 5, namely, is lower than the predetermined pressure P0, the first solenoid valve 81 is changed over to the selected position 81b by an instruction current value outputted from the first storage unit 91 and the second solenoid valve 82 is changed over to the selected position 82b by an instruction current value outputted from the second storage unit 92. The pilot line 84 is, therefore, cut off at the first solenoid valve 81. Accordingly, no pilot pressure arises in the pilot line 86, the flow control valve 26 is changed over to the selected position 26b, and the pilot line 40 and the pilot line 87 are brought into a state communicated with each other. When a boom-lowering operation is performed, a boom-lowering pilot pressure is, therefore, fed to the signal port of the center bypass selector valve 27 through the pilot line 40, pilot line 85, second solenoid valve 82 and the pilot line 87. As a consequence, the center bypass selector valve 27 is changed over to the selected position 27b.

When the selector valve 262 in the flow control valve 26 has been changed over to the selected position 26a and the center bypass selector valve 27 has been changed over to the selected position 27a, only the regenerated oil discharged from the bottom chamber 11a is fed to the rod chamber 11b and the boom 5 undergoes a free fall, as described in connection with the first embodiment. In this case, a pump control signal Xp1 corresponding to the reservoir pressure is outputted from the shuttle valve group 30 to the regulator 21a, and the displacement of the variable displacement hydraulic pump 21 is decreasingly controlled. When the first solenoid valve 81 and second solenoid valve 82, which make up the jack-up selector valve 25, have been changed over to the selected positions 81b,82b, respectively, and the center bypass selector valve 27 has been changed over to the selected position 27b, on the other hand, the regenerated oil and the pressure oil fed from the variable displacement hydraulic pump 21 are combined and fed to the rod chamber 11b and a strong pressing force such as a jack-up force for the body is produced, as described in connection with the first embodiment. In this case, a pump control signal Xp1 corresponding to the highest pressure selected at the shuttle valve group 30 is outputted from the shuttle valve group 30 to the regulator 21a, and the displacement of the variable displacement hydraulic pump 21 is increasingly controlled.

The hydraulic working machine according to this embodiment can also bring about similar advantageous effects as the hydraulic working machine according to the seventh embodiment.

(Tenth Embodiment of the Hydraulic Circuit)

Figure 13:
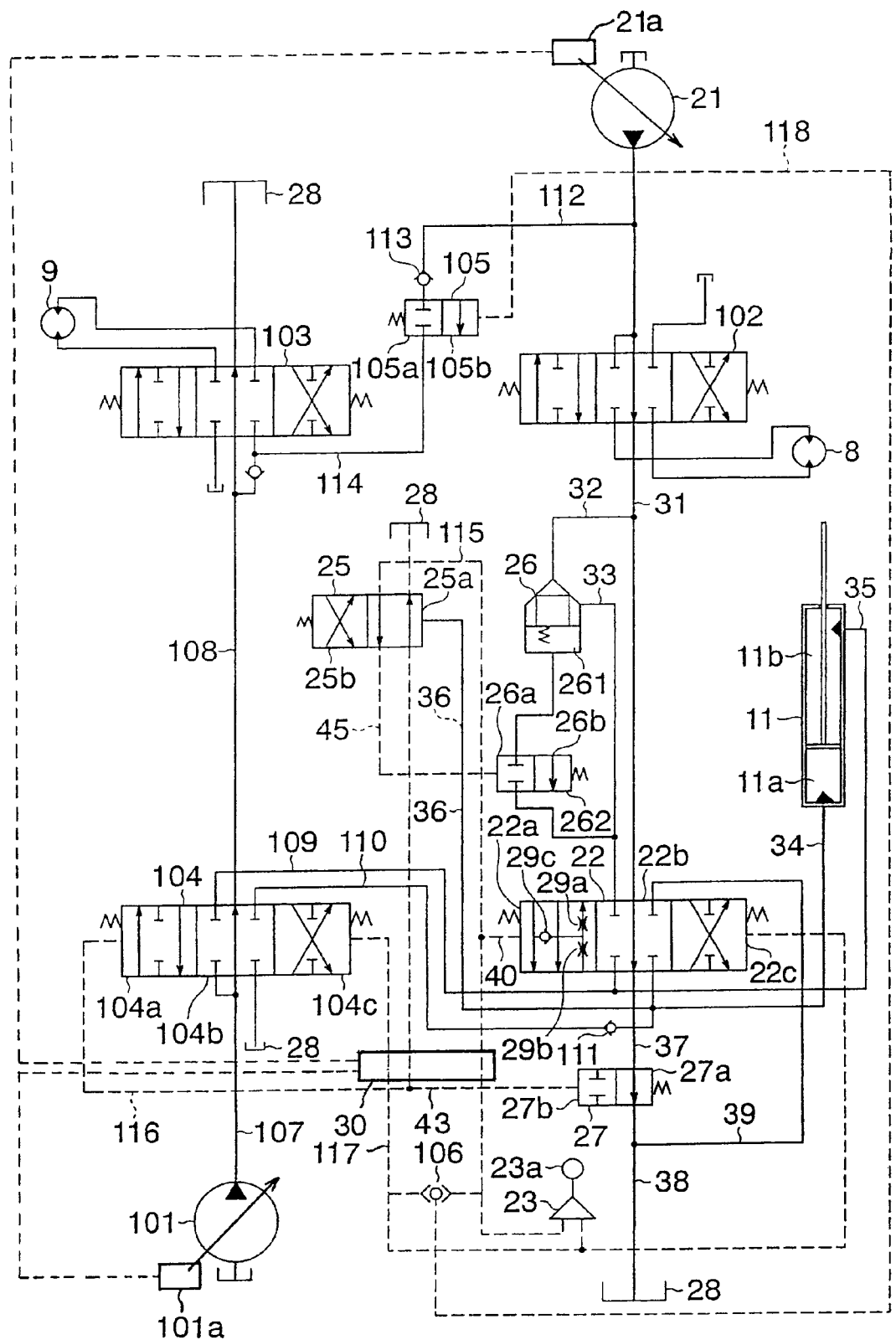
FIG. 13 is a circuit diagram of a hydraulic circuit according to a tenth embodiment.
Figure 14:
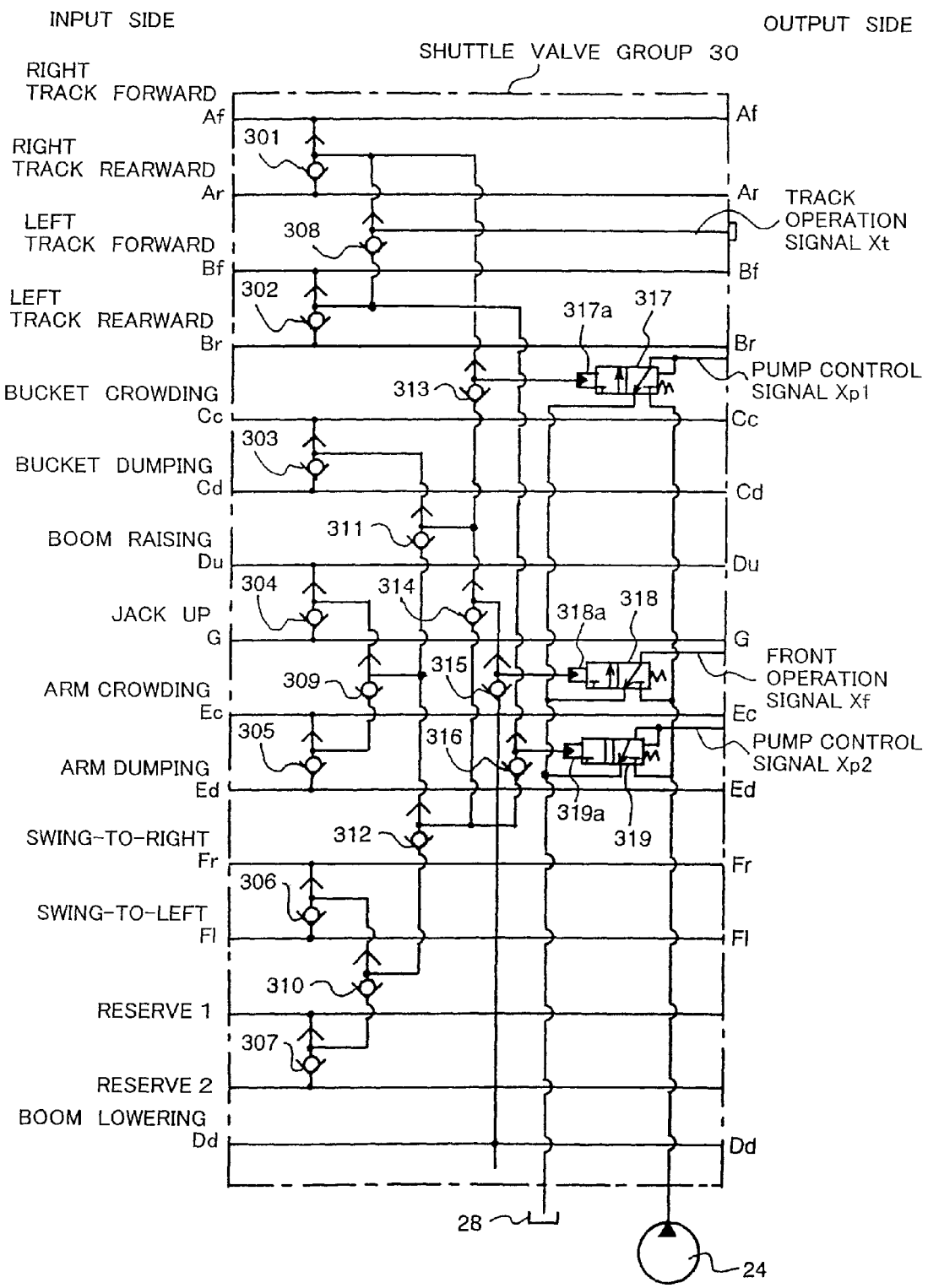
FIG. 14 is a construction diagram of a shuttle valve group arranged in the hydraulic circuit according to the tenth embodiment of the present invention.

With reference to FIG. 13 and FIG. 14, a description will next be made of the tenth embodiment of the hydraulic circuit arranged on the hydraulic working machine. FIG. 13 is a circuit diagram of the hydraulic circuit according to the tenth embodiment, and FIG. 14 is a construction diagram of a shuttle valve group arranged in the hydraulic circuit of the tenth embodiment. As clearly seen from these figures, the hydraulic circuit of this embodiment is characterized in that a track-unit-driving, hydraulic circuit is combined with a boom-driving, hydraulic circuit.

In FIG. 13, reference numeral 8 indicates the right-track hydraulic motor, reference numeral 9 the left-track hydraulic motor, reference numeral 101 the second variable displacement hydraulic pump, reference numeral 101a a second regulator (swash angle control means) for controlling the displacement of the second variable displacement hydraulic pump 101, reference numeral 102 the second directional control valve for controlling a flow of pressure oil to be fed from the variable displacement hydraulic pump 21 to the right-track hydraulic motor 8, reference numeral 103 a third directional control valve for controlling a flow of pressure oil to be fed from the second variable displacement hydraulic pump 101 to the left-track hydraulic motor 9, reference numeral 104 the fourth directional control valve for controlling a flow of pressure oil to be fed from the second variable displacement hydraulic pump 101 to the hydraulic boom cylinder 11, reference numeral 105 the selector valve for feeding the pressure oil, which is fed from the first variable displacement hydraulic pump 21, to the side of the left-track hydraulic motor 9 upon performing a boom-lowering operation, reference numeral 106 the shuttle valve for applying a change-over signal to the selector valve 105 when a boom operation has been performed, reference numeral 107 the line connecting the second variable displacement hydraulic pump 101 and the fourth directional control valve 104 with each other, reference numeral 108 the center bypass passage communicating the second variable displacement hydraulic pump 101 and the reservoir 28 with each other, reference numeral 109 the line connecting the fourth directional control valve 104 and the rod chamber 11b of the hydraulic boom cylinder 11 with each other, reference numeral 110 the line connecting the fourth directional control valve 104 and the bottom chamber 11a of the hydraulic boom cylinder 11 with each other, reference numeral 111 the check valve arranged on the line 110, reference numeral 112 a line connecting the variable displacement hydraulic pump 21 and the selector valve 105 with each other, reference numeral 113 the check valve arranged on the line 112, reference numeral 114 the line connecting the selector valve 105 and the third directional control valve 103 with each other, reference numeral 115 the pilot line guiding a pilot pressure, which serves as a boom-lowering signal, to the jack-up selector valve 25, reference numeral 116 the pilot line for feeding a boom-lowering signal to the signal port of the fourth directional control valve 104, reference numeral 117 the pilot line for feeding a boom-raising signal to the signal port of the fourth directional control valve 104, and reference numeral 118 the pilot line for feeding a change-over signal to the signal port of the selector valve 105. Other elements which are the same or equivalent to corresponding elements in FIG. 8 are shown by the same reference numerals.

It is to be noted that as shown in FIG. 14, the shuttle valve group 30 arranged in the hydraulic circuit in this embodiment has a construction with a shuttle valve 316 and a hydraulic selector valve 319 added to the shuttle valve group in FIG. 9. The shuttle valve 316 is arranged in a sixth stage of the shuttle valve group 30, and selects the higher one of the control signal pressures selected by the shuttle valve 302 in the first stage and the shuttle valve 312 in the third stage, respectively. The hydraulic selector valve 319 is a proportional reducing valve which, based on the highest pressure selected at the shuttle valve 316 and guided to a pressure-receiving part 319a, is operated to produce a control signal pressure (pump control signal Xp2) from the pressure of the pilot pump 24. When the highest pressure selected at the shuttle valve 316 is lower than the reservoir pressure, this hydraulic selector valve 319 is at the position indicated in the figure to reduce the control signal pressure to the reservoir pressure. When the highest pressure selected at the shuttle valve 316 becomes equal to or higher than the reservoir pressure, on the other hand, the hydraulic selector valve 319 is changed over from the position indicated in the figure, and outputs the pressure of the pilot pump 24 after reducing it to a control signal pressure corresponding to the level of the highest pressure. The regulator 101a for the second variable displacement hydraulic pump 101 is operated by the control signal pressure (pump control signal Xp2).

A description will hereinafter be made about operations of the hydraulic working machine according to the tenth embodiment constructed as described above.

When the control lever 23a is at the neutral position, the directional control valve 22 and the fourth directional control valve 104 retain the neutral position 22b and the neutral position 104b, respectively, as illustrated in FIG. 13. Accordingly, the jack-up selector valve 25 is changed over to the selected position 25a by the bottom-side pressure of the hydraulic boom cylinder 11. In this state, the pilot line 43 is in communication with the reservoir 28, so that the center bypass selector valve 27 retains the valve element position 27a and the selector valve 105 retains the valve element position 105a. Accordingly, the pressure oil delivered from the variable displacement hydraulic pump 21 is guided to the reservoir 28 through the line 31, the center bypass port of the directional control valve 22, the line 37, the center bypass selector valve 27 and the line 38. Further, the pressure oil delivered from the second variable displacement hydraulic pump 101 is guided to the reservoir 28 through the line 107, the line 108 and the center bypass port of the third directional control valve 103. No pressure oil is, therefore, fed to the bottom chamber 11a and rod chamber 11b of the hydraulic bottom cylinder 11.

When the control lever 23a is operated in the leftward direction as viewed in the figure, that is, in the boom-lowering direction in the above-described state, the pilot pressure which has been fed from the pilot pump 24 and reduced in pressure by the reducing valve 23b is outputted to the pilot line 40, and the directional control valve 22 is changed over to the selected position 22a. Further, this pilot pressure is guided to the pilot line 115 and then to the signal port of the selector valve 262 in the selector valve 262 via the jack-up selector valve 25, so that the selector valve 262 is changed over to the selected position 26a. As a consequence, a portion of the return oil from the bottom chamber 11a is regenerated in the rod chamber 11b via the restrictor 29b, check valve 29c and line 35, and the rest of the return oil is returned to the reservoir 28 via the restrictor 29a and line 39.

When the bottom pressure is higher than the operating pressure for the jack-up selector valve 25 in the above-described situation, the jack-up selector valve 25 is maintained at the valve element position 25a, so that the selected position of the flow control valve 26 is also maintained at the selected position 26a and the center bypass selector valve 27 is also maintained at the valve element position 27a. Accordingly, the pressure oil delivered from the variable displacement hydraulic pump 21 is guided to the reservoir 28 through the line 31, the center bypass port of the directional control valve 22, the line 37, the center bypass selector valve 27 and the line 38, and the pressure oil delivered from the second variable displacement hydraulic pump 101 is guided to the reservoir 28 through the line 107, the line 108 and the center bypass port of the third directional control valve 103. As a consequence, the pressure oil is fed neither to the bottom chamber 11a nor the rod chamber 11b of the hydraulic boom cylinder 11. Therefore, only the regenerated oil discharged from the bottom chamber 11a is fed to the rod chamber 11b, the hydraulic boom cylinder 11 contracts under the dead weight of the boom 5, and the boom 5 undergoes a free fall.

During the free fall of the boom 5, the pressure oil produced at the pilot control unit 23 does not enter the jack-up signal input port G of the shuttle valve group 30 but enters the boom-lowering signal input port Dd. The pressure at the jack-up signal input port G is subjected together with other plural control signals to highest pressure selection, and the thus-selected highest pressure changes over the hydraulic selector valve 317. When no other pilot control unit (not shown) is operated, however, the hydraulic selector valve 317 is not changed over and is retained in the state of FIG. 4. As a result, the reservoir pressure is outputted as pump control signals Xp1,Xp2 from the shuttle valve group 30, and the variable displacement hydraulic pumps 21,101 are decreasingly controlled via the regulators 21a,101a.

When the bottom pressure becomes lower than the operating pressure for the jack-up selector valve 25 in the situation that the control lever 23a has been operated in the boom-lowering direction, on the other hand, the jack-up selector valve 25 is changed over to the selected position 25b, so that the pilot line 45 is brought into communication with the reservoir 28 via the jack-up selector valve 25 and the selector valve 262 in the flow control valve 26 is changed over to the valve element position 26b. The pressure oil delivered from the variable displacement hydraulic pump 21 is, therefore, fed to the meter-in port of the directional control valve 22 through the line 32, the flow control valve 26 and the line 33. Responsive to a change-over of the jack-up selector valve 25, the pilot pressure is fed as a boom-lowering signal to the signal port of the center bypass selector valve 27 through the pilot line 115, jack-up selector valve 25 and pilot line 43. As a consequence, the center bypass selector valve 27 is changed over to the selected position 27b, the center bypass selector valve 27 is changed over to the selected position 27b, and the boom-lowering signal is also fed to the signal port on the boom-lowering side of the fourth directional control valve 104 through the pilot line 116. The fourth directional control valve 104 is, therefore, changed over to the selected position 104a. Accordingly, the pressure oil delivered from the variable displacement hydraulic pump 21 is fed to the rod chamber 11b of the hydraulic boom cylinder 11, the pressure oil delivered from the second variable displacement hydraulic pump 101 is fed to the rod chamber 11b of the hydraulic boom cylinder 11 through the fourth directional control valve 104, line 109 and line 35, and the regenerated oil discharged from the bottom chamber 11a, the pressure oil fed from the variable displacement hydraulic pump 21 and the pressure oil fed from the second variable displacement hydraulic pump 101 are combined and fed to the rod chamber 11b. It is hence possible to produce a strong pressing force like a jack-up force for the body.

Upon performing a jack-up, the pressure oil produced at the pilot control unit 23 enters the jack-up signal input port G of the shuttle valve group 30 and is subjected together with plural other control signals to highest pressure selection, and the thus-selected highest pressure changes over the hydraulic selector valve 317. As a result, a pressure corresponding to the highest pressure is outputted as pump control signals Xp1, Xp2 from the shuttle valve group 30, and the variable displacement hydraulic pumps 21,101 are increasingly controlled via the regulators 21a, 101a.

Further, the boom-operating pilot pressure is guided to the selector valve 105 via the shuttle valve 106 and line 118. Accordingly, the selector valve 105 is changed over to the selected position 105b, so that the pressure oil delivered from the variable displacement hydraulic pump 21 is fed to the left-track and right-track hydraulic motors 8,9 via the second directional control valve 102 and third directional control valve 103, respectively. As a consequence, when the boom and the tracks are operated at the same time, the pressure oil from the variable displacement hydraulic pump 21 is fed to the left-track and right-track motors 8,9 and the pressure oil from the second variable displacement hydraulic pump 101 is fed to the hydraulic boom cylinder 11, thereby making it possible to jack up the body by the combined operation of the track operation and the boom-lowering operation.

It is to be noted that, although a hydraulically-piloted selector valve was used as the jack-up selector valve 25 in the above-described tenth embodiment, an electrohydraulic or solenoid-operated selector valve can also be used as in the hydraulic working machines according to the seventh to ninth embodiments.

It is also to be noted that, although the hydraulic circuit for driving the hydraulic boom cylinder 11 was described by way of example in each of the above-described embodiments, the gist of the present invention is not limited to such hydraulic circuits but hydraulic circuits for driving hydraulic cylinders for other working elements can be formed into similar constructions as described above.

The invention claimed is:

1. A hydraulic working machine provided with:
   a double-acting hydraulic cylinder arranged for extension or contraction by pressure oil, which is delivered from a main pump, to drive a working element,
   a directional control valve for controlling a flow of pressure oil to be fed from said main pump to said hydraulic cylinder, and
   a control unit for performing a change-over control of said directional control valve, characterized in that said hydraulic working machine is provided with:
   a jack-up selector valve for being changed over in flow-line when a feed pressure to said hydraulic cylinder has reached a predetermined pressure, and
   a pilot-controlled flow-line changing means for changing a flow-line for pressure oil, which is to be fed from said main pump to a meter-in port of said directional control valve, from an open side to a closed side in response to a change-over control of said jack-up selector valve which generates a pilot hydraulic control signal from said jack-up selector valve to said pilot-controlled flow-line changing means,
   wherein, when a holding pressure on said hydraulic cylinder is equal to or higher than the predetermined pressure upon lowering said working element, said jack-up selector valve is changed over to a first selected position to change over said flow-line changing means to the closed side such that pressure oil delivered from said main pump is not fed to a non-holding pressure feeding side of said hydraulic cylinder, and
   when the holding pressure on said hydraulic cylinder is lower than the predetermined pressure upon lowering said working element, said jack-up selector valve is changed over to a second selected position to change over said flow-line changing means to the open side such that pressure oil delivered from said main pump is fed to a non-holding pressure side of said hydraulic cylinder via said directional control valve.

2. A hydraulic working machine according to claim 1, wherein as said jack-up selector valve, said hydraulic working machine is provided with a hydraulically-piloted selector valve.

3. A hydraulic working machine provided with a first and second main pumps, a first track unit for being driven by pressure oil delivered from said first main pump, a second track unit for being driven by pressure oil delivered from said second main pump, a first directional control valve for controlling a flow of pressure oil to be fed from said first main pump to said first track unit, a second directional control valve for controlling a flow of pressure oil to be fed from said second main pump to said second track unit, a working element, a double-acting hydraulic cylinder arranged for extension or contraction by pressure oil, which is delivered from said first and second main pumps, to drive said working element, a third directional control valve for controlling flows of pressure oil to be fed from said first main pump to a bottom chamber and rod chamber of said hydraulic cylinder, a fourth directional control valve for controlling flows of pressure oil to be fed from said second main pump to said bottom chamber and rod chamber of said hydraulic cylinder, a first control unit for performing change-over controls of said first and second directional control valves, and a second control unit for performing change-over controls of said third and fourth directional control valves, characterized in that said hydraulic working machine is provided with:
   a jack-up selector valve for being changed over when a bottom pressure on said hydraulic cylinder has reached a predetermined pressure, and
   a flow-line changing means for changing a flow-line for pressure oil, which is to be fed from said first main pump to a meter-in port of said third directional control valve, from an open side to a closed side in response to a change-over control of said jack-up selector valve,
   wherein, when the bottom pressure on said hydraulic cylinder is equal to or higher than the predetermined pressure upon lowering said working element, said jack-up selector valve is changed over to a first selected position to change over said flow-line changing means to the closed side such that pressure oil delivered from said first and second main pumps is not fed to said rod chamber of said hydraulic cylinder, and
   when the bottom pressure on said hydraulic cylinder is lower than the predetermined pressure upon lowering said working element, said jack-up selector valve is changed over to a second selected position to change over said flow-line changing means to the open side such that pressure oil delivered from said first and second main pumps is fed to said rod chamber of said hydraulic cylinder via said third and fourth directional control valves.

4. A hydraulic working machine provided with a first and second variable displacement hydraulic pumps as main pumps, a first and second swash angle control means for independently controlling displacements of said first and second variable displacement hydraulic pumps, respectively, a first track unit for being driven by pressure oil delivered from said first variable displacement hydraulic pump, a second track unit for being driven by pressure oil delivered from said second variable displacement hydraulic pump, a first directional control valve for controlling a flow of pressure oil to be fed from said first variable displacement hydraulic pump to said first track unit, a second directional control valve for controlling a flow of pressure oil to be fed from said second variable displacement hydraulic pump to said second track unit, at least one working element, at least one actuator arranged for extension or contraction by pressure oil, which is delivered from said first and second variable displacement hydraulic pumps, to drive said working element, a third directional control valve for controlling a flow of pressure oil to be fed from said first variable displacement hydraulic pump to said actuator, a fourth directional control valve for controlling a flow of pressure oil to be fed from said second variable displacement hydraulic pump to said actuator, a pilot control unit for performing change-over controls of said first and second directional control valves, and a swash angle instruction means for outputting a swash angle control signal to said swash angle control means in response to a signal from said pilot control unit, characterized in that said hydraulic working machine is provided with:
- a jack-up selector valve for being changed over when a holding pressure on said actuator has reached a predetermined pressure, and
- a flow-line changing means for changing a flow-line for pressure oil, which is to be fed from said first variable displacement hydraulic pump to a meter-in port of said third directional control valve, from an open side to a closed side in response to a change-over control of said jack-up selector valve, wherein, when the holding pressure on said actuator is equal to or higher than the predetermined pressure upon lowering said working element, said jack-up selector valve is changed over to a first selected position to change over said flow-line changing means to the closed side such that pressure oil to be fed from said first and second variable displacement hydraulic pumps to said actuator is cut off and the displacements of said first and second variable displacement hydraulic pumps are decreasingly controlled, and when the holding pressure on said actuator is lower than the predetermined pressure upon lowering said working element, said jack-up selector valve is changed over to a second selected position to change over said flow-line changing means to the open side such that pressure oil delivered from said first and second variable displacement hydraulic pumps is fed to said actuator via said third and fourth directional control valves and the displacements of said first and second variable displacement hydraulic pumps are increasingly controlled by said swash angle instruction means.

* * * * *